United States Patent
Fujioka

(10) Patent No.: US 11,623,473 B2
(45) Date of Patent: Apr. 11, 2023

(54) WHEEL AND VEHICLE

(71) Applicant: NSK LTD., Tokyo (JP)

(72) Inventor: Ko Fujioka, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/790,307

(22) PCT Filed: Oct. 30, 2020

(86) PCT No.: PCT/JP2020/040750
§ 371 (c)(1),
(2) Date: Jun. 30, 2022

(87) PCT Pub. No.: WO2021/161591
PCT Pub. Date: Aug. 19, 2021

(65) Prior Publication Data
US 2023/0041624 A1  Feb. 9, 2023

(30) Foreign Application Priority Data
Feb. 14, 2020  (JP) .............................. JP2020-023784

(51) Int. Cl.
*B60B 19/04* (2006.01)
*B60B 19/00* (2006.01)
*F16H 57/08* (2006.01)

(52) U.S. Cl.
CPC .............. *B60B 19/04* (2013.01); *B60B 19/00* (2013.01); *F16H 57/08* (2013.01); *B60B 2900/551* (2013.01); *B60B 2900/70* (2013.01)

(58) Field of Classification Search
CPC ... B60B 19/00; B60B 19/04; B60B 2900/551; F16H 57/08; B62B 5/026; A61G 5/06;
(Continued)

(56) References Cited

U.S. PATENT DOCUMENTS

2013/0081885 A1* 4/2013 Connor .................. B60B 19/02
180/8.2
2022/0126627 A1* 4/2022 Sheffield ................. B60B 19/04

FOREIGN PATENT DOCUMENTS

CN      102328704 A      1/2012
CN      104249599 A  *  12/2014
(Continued)

OTHER PUBLICATIONS

International Search Report for PCT/JP2020/040750 dated, Dec. 28, 2020 (PCT/ISA/210).

*Primary Examiner* — Kip T Kotter
(74) *Attorney, Agent, or Firm* — Sughrue Mion, PLLC

(57) ABSTRACT

A wheel and a vehicle each having a simple structure and capable of moving over a step while maintaining stability at flat ground traveling are provided. A wheel includes an outer ring that rotates about a wheel rotational axis, an arm drive gear that rotates independently from the outer ring about the wheel rotational axis, and an arm capable of rotating about an arm rotational axis fixed to the outer ring, the arm being configured to partially protrude outside from an outer peripheral surface of the outer ring in a radial direction as the arm drive gear rotates relative to the outer ring in one direction (normal rotational direction) and to be housed inside in the radial direction from the outer peripheral surface of the outer ring as the arm drive gear rotates relative to the outer ring in the other direction (reverse rotational direction) opposite to the one direction.

6 Claims, 16 Drawing Sheets

(58) Field of Classification Search
CPC ........ A61G 5/061; A61G 5/063; A61G 5/065; B60Y 2200/48
See application file for complete search history.

(56) References Cited

FOREIGN PATENT DOCUMENTS

| | | | | |
|---|---|---|---|---|
| CN | 105459728 A | 4/2016 | | |
| DE | 29611878 U1 | * 11/1996 | ............... | A01G 9/02 |
| JP | 2003-267277 A | 9/2003 | | |
| JP | 2010-155520 A | 7/2010 | | |
| JP | 2010-264923 A | 11/2010 | | |
| JP | 2011-031796 A | 2/2011 | | |
| JP | 2013-052779 A | 3/2013 | | |
| KR | 20120075027 A | * 7/2012 | | |
| KR | 20120133504 A | * 12/2012 | | |
| WO | WO-2010087542 A1 | * 8/2010 | ............. | B60B 19/04 |

\* cited by examiner

WHEEL AND VEHICLE

CROSS REFERENCE TO RELATED APPLICATIONS

This application is a National Stage of International Application No. PCT/JP2020/040750 filed Oct. 30, 2020, claiming priority based on Japanese Patent Application No. 2020-023784 filed Feb. 14, 2020.

FIELD

The present invention relates to a wheel and a vehicle.

BACKGROUND

Technologies of moving over or climbing on an obstacle such as a step, an irregularity, a tilt, or a stair that exists on a traveling path are required for a drive wheel mounted on a self-propelled vehicle such as a home delivery robot, an auto guided vehicle (AGV), a conveyance cart, an electric wheelchair, a cleaning robot, or a partner robot. Patent Literature 1 discloses the structure of a wheel that moves over a step by selectively protruding and opening a plurality of divided parts divided in the circumferential direction of a traveling wheel and supported to be able to protrude, retract, open, and close in the radial direction of the traveling wheel and by engaging the divided parts with the step. In addition, Patent Literature 2 discloses the structure of a wheel including a plurality of rolling click bodies provided at predetermined intervals in a circumferential direction and configured to form a rolling peripheral surface at a closed rotational position and protrude outside the rolling peripheral surface at an opened rotational position.

CITATION LIST

Patent Literature

Patent Literature 1: Japanese Patent Application Laid-open No. 2010-155520
Patent Literature 2: Japanese Patent Application Laid-open No. 2011-031796

SUMMARY

Technical Problem

However, in the wheel of Patent Literature 1, a transformation actuator for each divided part is disposed on the wheel side, and thus a transfer unit from a drive source to the rotating actuator has a complicated mechanism. Furthermore, in the wheel of Patent Literature 2, an outer ring of the wheel is transformed and thus is not a complete circle, which causes a problem with stability at traveling.

The present invention is made in view of the above description and intended to provide a wheel and a vehicle each having a simple structure and capable of moving over a step while maintaining stability at flat ground traveling.

Solution to Problem

A wheel according to an embodiment of the present invention comprising: an outer ring that rotates about a wheel rotational axis; an arm drive gear that rotates independently from the outer ring about the wheel rotational axis; and an arm capable of rotating about an arm rotational axis fixed to the outer ring, the arm being configured to partially protrude outside an outer peripheral surface of the outer ring in a radial direction as the arm drive gear rotates relative to the outer ring in one direction and to be housed inside the outer peripheral surface of the outer ring in the radial direction as the arm drive gear rotates relative to the outer ring in another direction opposite to the one direction.

At flat ground traveling, each arm of the wheel is housed inside the outer peripheral surface 11 of the outer ring in the radial direction, and accordingly, the outer ring rolls. At flat ground traveling, the outer ring being not transformed rolls, and thus the wheel can maintain stability at flat ground traveling. Moreover, at step traveling, the wheel can move over a step by catching the step with the arm as the arm protrudes outside the outer peripheral surface of the outer ring in the radial direction. The arm can be opened and housed with a simple structure in which the outer ring and the arm drive gear relatively rotate.

In the wheel according to an embodiment of the present invention, the arm includes a tooth part that meshes with the arm drive gear, rotates in the other direction as the arm drive gear rotates relative to the outer ring in the one direction, and rotates in the one direction as the arm drive gear rotates relative to the outer ring in the other direction. With this configuration, the arm rotates in the other direction as the arm drive gear rotates relative to the outer ring in one direction. Accordingly, the structure of a transfer path from a drive source of the arm to the arm is simplified.

In the wheel according to an embodiment of the present invention, the arm maintains a state of protruding or a state of being housed when the arm drive gear does not rotate relative to the outer ring. With this configuration, unintended transformation of the wheel can be prevented, and thus step traveling and flat ground traveling can be stably performed.

In the wheel according to an embodiment of the present invention, the arm includes, at part of an outer peripheral surface, a first arc wall part having a convex shape with a curvature center identical to a curvature center of the outer ring and with a curvature radius equal to a curvature radius of the outer ring in a state of being housed inside the outer peripheral surface of the outer ring in the radial direction. With this configuration, the torque generated by the drive source of the arm can be used at flat ground traveling as well.

In the wheel according to an embodiment of the present invention, the arm includes, at part of an outer peripheral surface, a second arc wall part having a concave shape partially protruding outside from the outer peripheral surface of the outer ring in the radial direction in a state of partially protruding outside from the outer peripheral surface of the outer ring in the radial direction. With this configuration, it is possible to more excellently grapple a step with the arm at step traveling.

The wheel according to an embodiment of the present invention comprising: an arm actuator configured to drive the arm drive gear; an outer ring gear that rotates integrally with the outer ring about the wheel rotational axis; an outer ring drive gear that meshes with the outer ring gear and rotates about an outer ring drive rotational axis parallel to the wheel rotational axis; and an outer ring actuator configured to drive independently from the arm actuator and drive the outer ring drive gear. With this configuration, the wheel travels with the combined torque of the arm actuator and the outer ring actuator at both flat ground traveling and at step traveling, and thus the torque of each actuator can be reduced.

The wheel according to an embodiment of the present invention, further comprising: an arm actuator configured to drive the arm drive gear; and an electromagnetic clutch capable of switching between a state in which power of the arm actuator is transferred to the outer ring and a state in which power of the arm actuator is not transferred to the outer ring, depending on existence of energization. With this configuration, the wheel of the second embodiment includes only one actuator and thus does not need to synchronize a plurality of actuators. Specifically, in a state in which the electromagnetic clutch is energized, the arm can maintain an opened state or a housed state. In a state in which the electromagnetic clutch is not energized, opening operation or housing operation of the arm is possible, depending on the rotational direction of the arm drive gear. Thus, the wheel can be easily controlled.

The wheel according to an embodiment of the present invention, further comprising: an arm actuator configured to drive the arm drive gear; a first stopper in the one direction configured to restrict a rotation range of the arm in the one direction; and a second stopper in the other direction configured to restrict a rotation range of the arm in the other direction. With this configuration, unintended transformation of the wheel can be prevented, and thus step traveling and flat ground traveling can be stably performed. Moreover, the arm is relatively fixed to the outer ring through the first stopper and the arm rotation axis when the arm driver gear rotates in the other direction while the rotation of the arm in the one direction is restricted by the first stopper. With this configuration, the torque of the arm drive gear is transferred to the outer ring in a state in which the arm is at a closed rotational position, and thus the torque generated by the drive source of the arm can be used at flat ground traveling as well. In addition, the arm is relatively fixed to the outer ring through the second stopper and the arm rotational axis when the arm drive gear rotates in the one direction while the rotation of the arm in the other direction is restricted by the second stopper. With this configuration, the torque of the arm drive gear is transferred to the outer ring in a state in which the arm is at an opened rotational position, and thus the torque generated by the drive source of the arm can be excellently used for step traveling.

A vehicle according to an embodiment of the present invention comprising: the wheel; and a vehicle body to which the wheel rotational axis of the wheel is fixed. At flat ground traveling, each arm of the wheel is housed inside the outer peripheral surface of the outer ring in the radial direction, and accordingly, the outer ring rolls. Since the vehicle includes the wheel in which the outer ring being not transformed rolls at flat ground traveling, the vehicle can maintain stability at flat ground traveling. At step traveling, the arm of the wheel protrudes outside the outer peripheral surface of the outer ring in the radial direction, and accordingly, the vehicle can move over a step by catching the step with the arm. The arm of the wheel can be opened and housed with a simple structure in which the outer ring and the arm drive gear relatively rotate.

Advantageous Effects of Invention

According to the present invention, it is possible to provide a wheel and a vehicle each having a simple structure and capable of moving over a step while maintaining stability at flat ground traveling.

DESCRIPTION OF EMBODIMENTS

The following describes aspects (embodiments) of the present disclosure in detail with reference to the accompanying drawings. Contents described below in the embodiments do not limit the present disclosure.

Components described below include those that could be easily thought of by the skilled person in the art and those identical in effect. Components described below may be combined as appropriate.

First Embodiment

Figure 1:
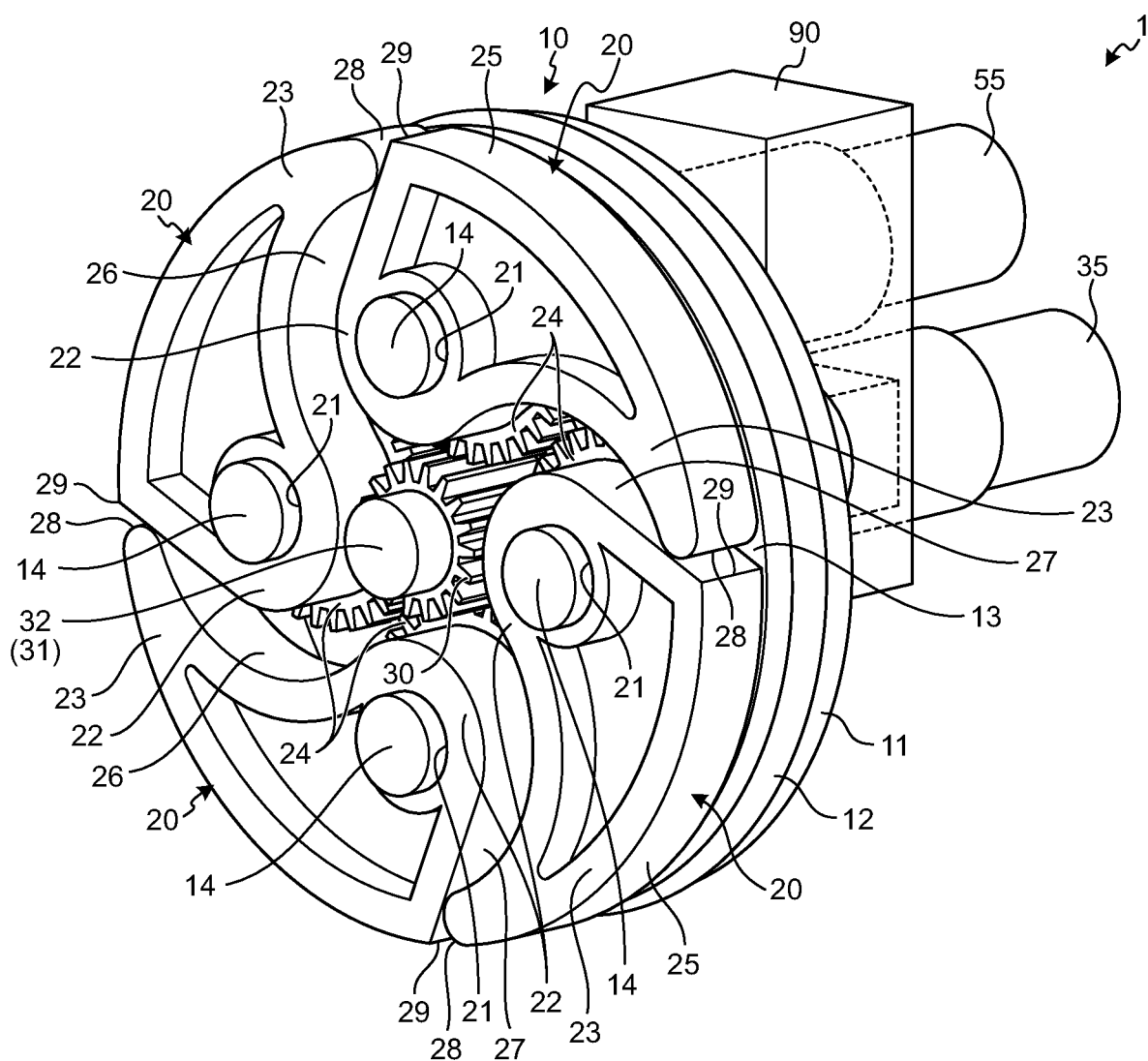
FIG. 1 is a perspective view schematically illustrating the configuration of a wheel according to a first embodiment.
Figure 2:
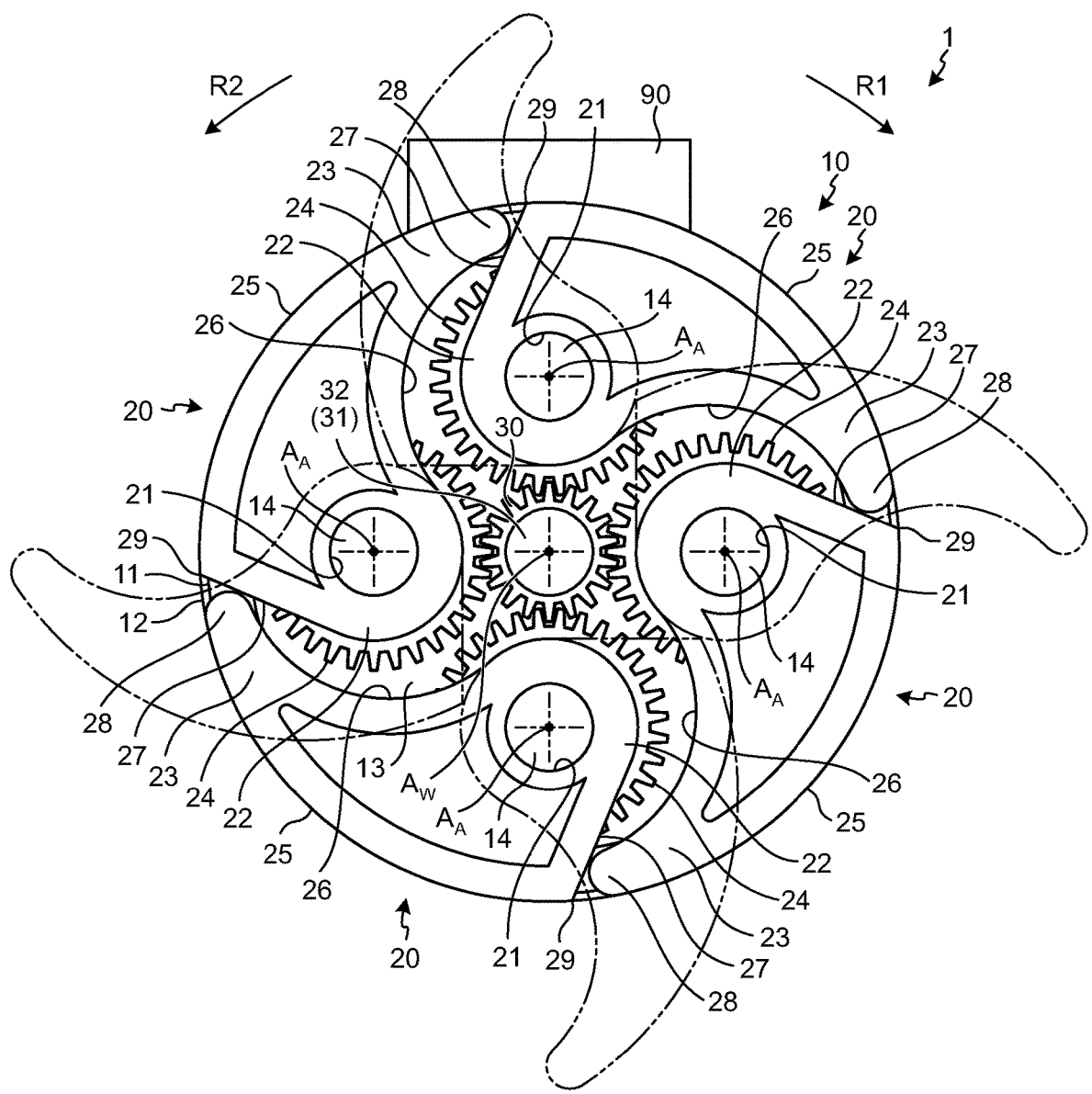
FIG. 2 is a side view schematically illustrating the configuration of the wheel in FIG. 1.
Figure 3:
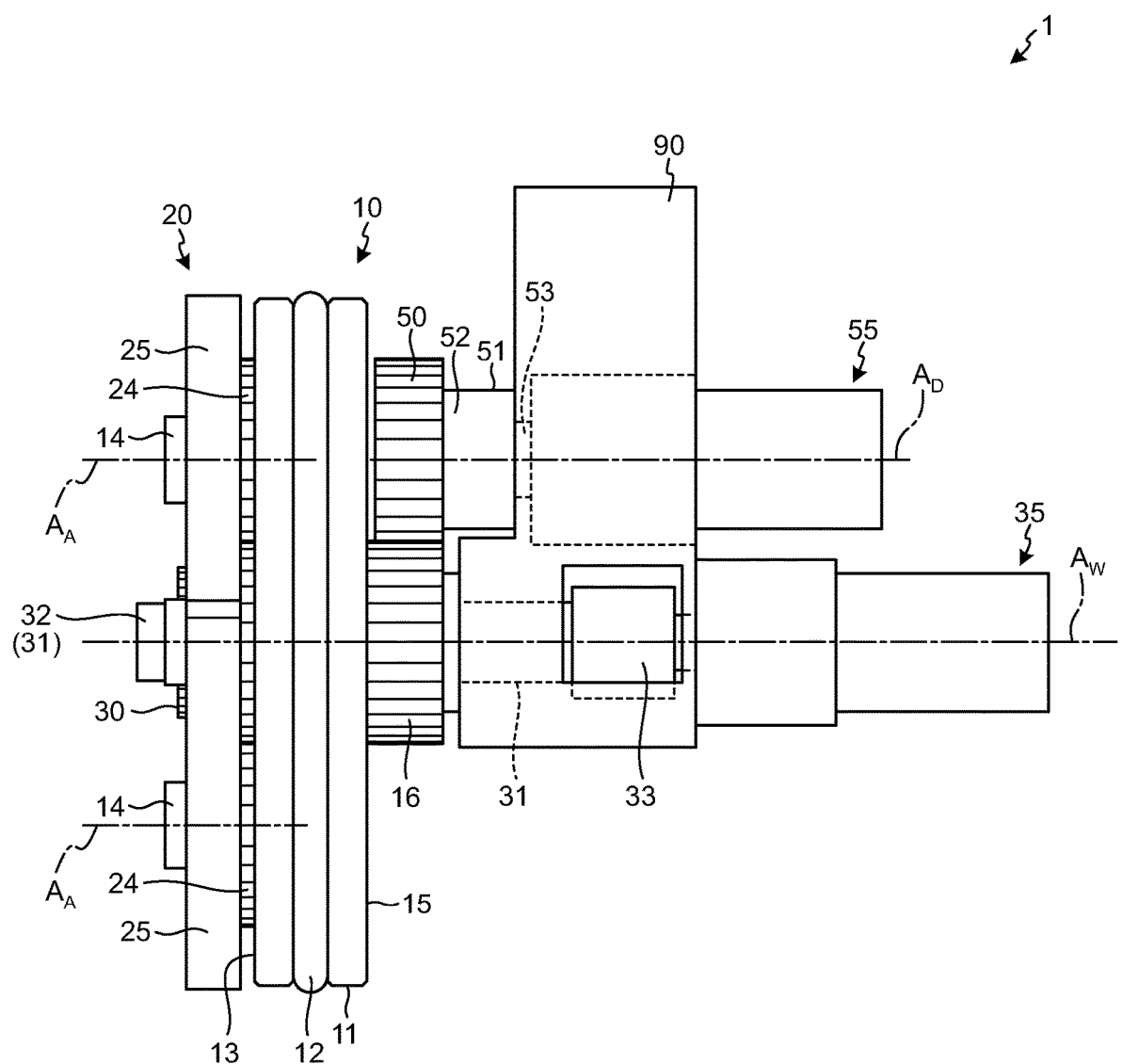
FIG. 3 is a front view illustrating the state of the wheel in FIG. 1 at flat ground traveling.
Figure 4:
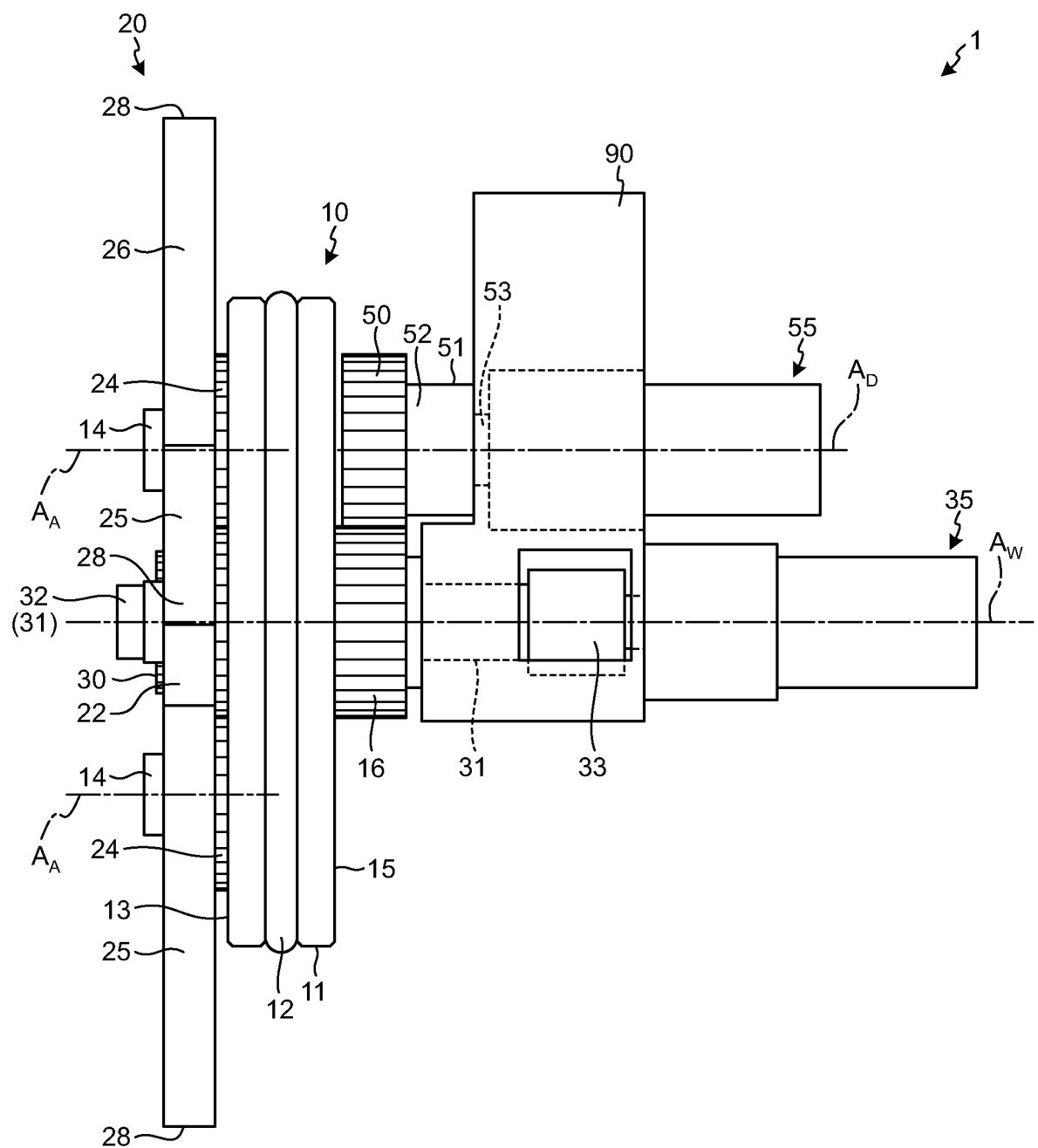
FIG. 4 is a front view illustrating the state of the wheel in FIG. 1 at step traveling.

The following first describes the configuration of a wheel 1 according to a first embodiment with reference to FIGS. 1 to 4. FIG. 1 is a perspective view schematically illustrating the configuration of the wheel 1 according to the first embodiment. FIG. 2 is a side view schematically illustrating the configuration of the wheel 1 in FIG. 1. FIG. 3 is a front view illustrating the state of the wheel 1 in FIG. 1 at flat ground traveling. FIG. 4 is a front view illustrating the state of the wheel 1 in FIG. 1 at step traveling. In the following description, a rotational direction in which the wheel 1 can move over a step is referred to as a normal rotational direction R1, and a rotational direction opposite to the normal rotational direction R1 is referred to as a reverse rotational direction R2.

The wheel 1 of the first embodiment is a drive wheel mounted on a self-propelled vehicle such as a home delivery robot, an auto guided vehicle, a conveyance cart, an electric wheelchair, a cleaning robot, or a partner robot. The self-propelled vehicle is assumed to be, for example, a four-wheel vehicle (for example, refer to FIG. 15 to be described later) in which the wheels 1 are disposed symmetric in the right-left direction, but is not limited thereto in the present invention. In the first embodiment, drive power for flat ground traveling and step traveling of the wheel 1 is supplied from an energy source such as a power source mounted on a vehicle body side of a self-propelled vehicle on which the wheel 1 is mounted. The wheel 1 includes an outer ring 10, an arm 20, an arm drive gear 30, an outer ring drive gear 50, and a support portion 90.

The outer ring 10 has a circular disk shape with a central axis along a wheel rotational axis $A_W$ of the wheel 1. The outer ring 10 has, at the center, a hole into which an arm drive shaft 31 to be described later is inserted. The entire circumference of an outer peripheral surface 11 of the outer ring 10 serves as a rolling peripheral surface of the wheel 1. The outer ring 10 includes a tire portion 12 having a ring shape and attached in the circumferential direction of the outer peripheral surface 11. The tire portion 12 is formed of rubber or the like and absorbs impact on the outer ring 10, which is received from an installation surface at traveling.

Four arms 20 are disposed on an outside surface 13 side of the outer ring 10. Note that, the outside surface 13 of the outer ring 10 is a side surface facing the outside of a vehicle body when the wheel 1 is mounted on a self-propelled vehicle. The outer ring 10 includes four arm support portions 14 that rotatably support the four arms 20 about respective arm rotational axes $A_A$. The arm rotational axes $A_A$ are parallel to the wheel rotational axis $A_W$. The arm rotational axes $A_A$ all have a distance equal to the wheel rotational axis $A_W$. The arm rotational axes $A_A$ are provided at equal intervals in a rotational direction with respect to the wheel rotational axis $A_W$.

In the first embodiment, each arm support portion 14 is a cylindrical shaft member protruding outside the outside surface 13 of the outer ring 10. Each arm support portion 14 allows insertion of a shaft hole 21 of the corresponding arm 20. The four arm support portions 14 are provided at equal intervals in the rotational direction with respect to the wheel rotational axis $A_W$. The arm support portions 14 may be formed integrally with the outer ring 10 or may be separately provided and fixed to the outer ring 10. The arm support portions 14 may be any components that rotatably support the arms 20 about the arm rotational axes $A_A$.

An outer ring gear 16 is disposed on a side closer to an inside surface 15 that is a side surface opposite to the outside surface 13 of the outer ring 10 (refer to FIGS. 3 and 4). The outer ring gear 16 is an outer gear disposed coaxially with the outer ring 10. In other words, the outer ring gear 16 has a rotational axis identical to the wheel rotational axis $A_W$ of the wheel 1. The outer ring gear 16 rotates integrally with the outer ring 10. The outer ring gear 16 is fixed to the outer ring 10 or provided integrally with the outer ring 10.

In the first embodiment, the four arms 20 are provided to one wheel 1. The arms 20 are supported rotatably about the arm rotational axes $A_A$, respectively, by the arm support portions 14 inserted into the shaft holes 21 (refer to FIG. 2). Each arm 20 can rotate about the corresponding arm rotational axis $A_A$ between a closed rotational position illustrated with a solid line in FIG. 2 and an opened rotational position illustrated with a dashed and double-dotted line. Each arm 20 includes a base end circular part 22 and a click part 23. Each arm 20 has an outer peripheral surface formed by a tooth part 24, a first arc wall part 25, a second arc wall part 26, and a base end side wall part 27.

The base end circular part 22 has a cylindrical shape with a central axis at the arm rotational axis $A_A$. The corresponding shaft hole 21 is formed at the center of the base end circular part 22. The click part 23 is provided as a protrusion in a radial direction of the base end circular part 22. At the closed rotational position, the click part 23 is housed inside the outer peripheral surface 11 of the outer ring 10 in the radial direction. At the opened rotational position, a leading end part 28 of the click part 23 protrudes outside the outer peripheral surface 11 of the outer ring 10 in the radial direction.

The tooth part 24 is formed at part of the circumferential surface of the base end circular part 22. The tooth part 24 meshes with the arm drive gear 30 to be described later. The first arc wall part 25 is part of the outer peripheral surface of the click part 23 and has a convex arc shape. In the first embodiment, the first arc wall part 25 has a curvature radius equal to that of the outer ring 10. The first arc wall part 25 has a curvature center that is the same as that of the outer ring 10 when the arm 20 is housed inside the outer peripheral surface 11 of the outer ring 10 in the radial direction and located at the closed rotational position. Specifically, the first arc wall part 25 forms part of the rolling peripheral surface of the wheel 1 when the arm 20 is located at the closed rotational position. An end part of the first arc wall part 25 on the normal rotational direction R1 side is the leading end part 28 of the click part 23. The second arc wall part 26 is part of the outer peripheral surface of the click part 23 and has a concave arc shape. One end of the second arc wall part 26 is the leading end part 28 of the click part 23. The second arc wall part 26 is adjacent to the first arc wall part 25 through the leading end part 28. The other end of the second arc wall part 26 connects to an end part of the tooth part 24 of the base end circular part 22 on the reverse rotational direction R2 side. The second arc wall part 26 curves in the same direction as that of the first arc wall part 25.

One end of the base end side wall part 27 connects to an end part of the tooth part 24 of the base end circular part 22 on the normal rotational direction R1 side. The other end of the base end side wall part 27 is adjacent to an end part of the first arc wall part 25 on the reverse rotational direction R2 side through a stopping part 29. The leading end part 28 is formed between the first arc wall part 25 and the second arc wall part 26. The leading end part 28 has roundness in the embodiment. The arm 20 is formed in a shape that gradually narrows from the base end side wall part 27 side including the base end circular part 22 toward the leading end part 28 of the click part 23.

At the closed rotational position, the base end side wall part 27 serves as a stopper that contacts the leading end part 28 of the arm 20 adjacent on the reverse rotational direction R2 side, thereby preventing further rotation of the arm 20. The stopping part 29 is a corner part formed between the first arc wall part 25 and the base end side wall part 27. At the opened rotational position, the stopping part 29 serves as a stopper that contacts the base end circular part 22 of the arm 20 adjacent on the reverse rotational direction R2 side, thereby preventing further rotation of the arm 20.

As illustrated in FIGS. 3 and 4, the arm drive gear 30 is an outer gear having a rotational axis that is coaxial with the wheel rotational axis $A_W$ of the wheel 1. The arm drive gear 30 meshes with the tooth parts 24 of the four arms 20.

The arm drive gear 30 is provided at an outer end part 32 that is one end part of the arm drive shaft 31. The outer end part 32 is an end part of the arm drive shaft 31, which is positioned outside a vehicle body when the wheel 1 is mounted on a self-propelled vehicle. The arm drive shaft 31 is a shaft member having a rotational axis that is coaxial with the wheel rotational axis $A_W$ of the wheel 1. The arm drive gear 30 rotates integrally with the arm drive shaft 31. The arm drive shaft 31 is inserted into a hole formed at the center of the outer ring 10. The arm drive gear 30 and the arm drive shaft 31 rotate independently from the outer ring 10.

An inner end part 33 that is an end part of the arm drive shaft 31, which is opposite to the outer end part 32, is fixed to an output shaft of an arm actuator 35. The arm actuator 35 is a rotational drive source of the arm drive gear 30. The torque generated by the arm actuator 35 is transferred to the arms 20 through the arm drive gear 30. The arm actuator 35 is, for example, a motor of an inner-rotor type. The arm actuator 35 includes, for example, a stator, a rotor that rotates relative to the stator when supplied with electric power, and the output shaft that rotates together with the rotor. The output shaft of the arm actuator 35 is coaxial with the wheel rotational axis $A_W$ of the wheel 1 and a rotational axis of the arm drive shaft 31.

The arm actuator 35 is supplied with electric power from a power source (not illustrated) provided on the vehicle body side of a self-propelled vehicle on which the wheel 1 is mounted. When supplied with electric power, the arm actuator 35 rotates the arm drive gear 30 about the wheel rotational axis $A_W$ through the arm drive shaft 31. The rotational direction and rotational speed of the output shaft of the arm actuator 35 are controlled by, for example, a control device provided on the vehicle body side of a self-propelled vehicle on which the wheel 1 is mounted.

As illustrated in FIGS. 3 and 4, the outer ring drive gear 50 is an outer gear having a rotational axis at an outer ring drive rotational axis $A_D$ parallel to the wheel rotational axis $A_W$ of the wheel 1 and the rotational axis of the outer ring gear 16. The outer ring drive rotational axis $A_D$ may be coaxial with one of the arm rotational axes $A_A$ or may be an axis different from all arm rotational axes $A_A$. The outer ring drive gear 50 is disposed on the inside surface 15 side of the outer ring 10. The outer ring drive gear 50 meshes with the outer ring gear 16. The outer ring drive gear 50 rotates in a direction opposite to the rotational direction of the outer ring gear 16.

The outer ring drive gear 50 is provided at an outer end part 52 that is one end part of an outer ring drive shaft 51. The outer end part 52 is an end part of the outer ring drive shaft 51, which is positioned outside a vehicle body when the wheel 1 is mounted on a self-propelled vehicle. The outer ring drive shaft 51 is a shaft member having a rotational axis at the outer ring drive rotational axis $A_D$. The outer ring drive gear 50 rotates integrally with the outer ring drive shaft 51.

An inner end part 53 that is an end part of the outer ring drive shaft 51, which is opposite to the outer end part 52, is fixed to an output shaft of an outer ring actuator 55. The outer ring actuator 55 is a rotational drive source of the outer ring drive gear 50. The torque generated by the outer ring actuator 55 is transferred to the outer ring gear 16 and the outer ring 10 through the outer ring drive gear 50. The outer ring actuator 55 is, for example, a motor of an inner-rotor type. The outer ring actuator 55 includes, for example, a stator, a rotor that rotates relative to the stator when supplied with electric power, and the output shaft that rotates together with the rotor. The output shaft of the outer ring actuator 55 is parallel to the wheel rotational axis $A_W$ of the wheel 1 and the rotational axis of the arm drive shaft 31 and coaxial with the outer ring drive gear 50 and the outer ring drive rotational axis $A_D$ of the outer ring drive shaft 51.

The outer ring actuator 55 is supplied with electric power from a power source (not illustrated) provided on the vehicle body side of a self-propelled vehicle on which the wheel 1 is mounted. When supplied with electric power, the outer ring actuator 55 rotates the outer ring drive gear 50 through the outer ring drive shaft 51. In other words, the outer ring actuator 55 rotates the outer ring gear 16 and the outer ring 10 about the wheel rotational axis $A_W$ through the outer ring drive shaft 51 and the outer ring drive gear 50. The output shaft of the outer ring actuator 55, the outer ring drive shaft 51, and the outer ring drive gear 50 rotate in a direction opposite to the rotational directions of the outer ring gear 16 and the outer ring 10. The rotational direction and rotational speed of the output shaft of the outer ring actuator 55 are controlled by, for example, a control device provided on the vehicle body side of a self-propelled vehicle on which the wheel 1 is mounted.

Figure 15:
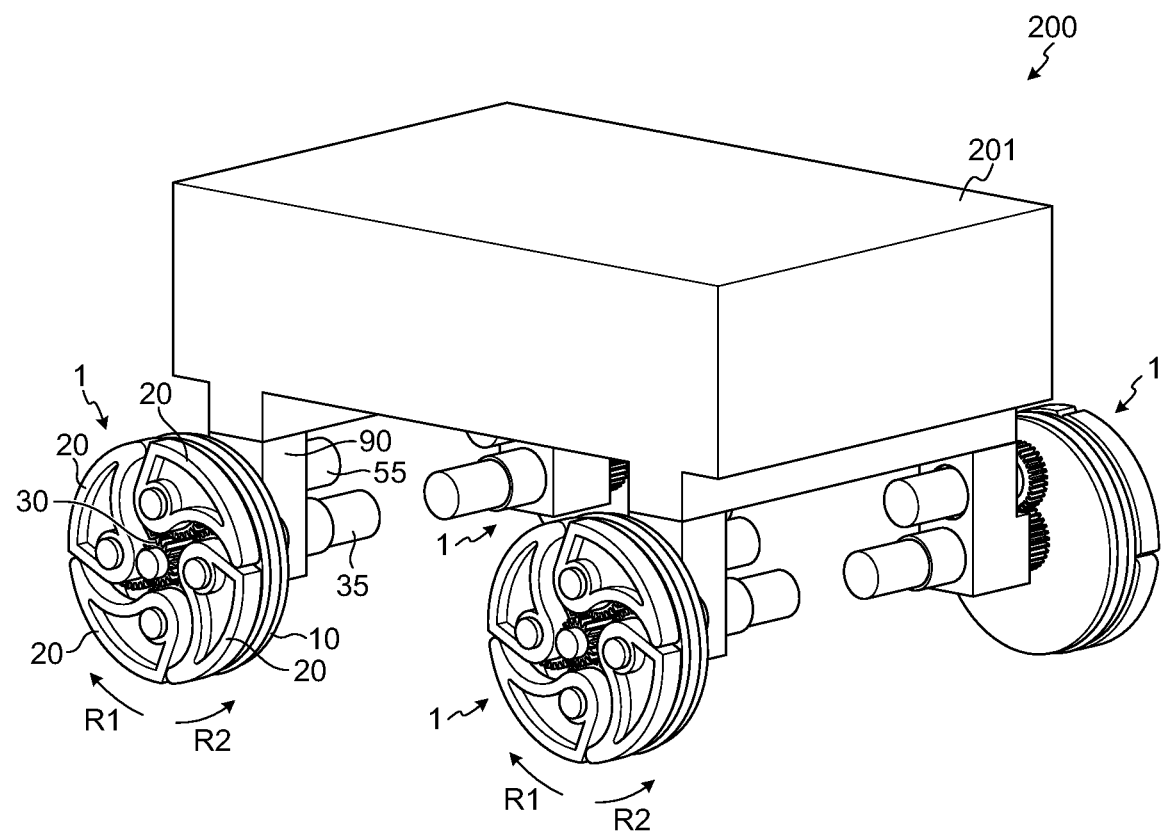
FIG. 15 is a perspective view schematically illustrating an exemplary configuration of a vehicle as an exemplary application in which the wheel according to the first embodiment is mounted.

The support portion 90 supports housings of the arm actuator 35 and the outer ring actuator 55. The support portion 90 is fixed to a vehicle body 201 of a self-propelled vehicle on which the wheel 1 is mounted, for example, as illustrated in FIG. 15 to be described later. When the support portion 90 is fixed to the vehicle body 201 of the self-propelled vehicle, the wheel rotational axis $A_W$ of the wheel 1 and the outer ring drive rotational axis $A_D$ of the outer ring drive gear 50 are fixed to the vehicle body 201 of the self-propelled vehicle.

The following describes the actuation of the wheel 1 of the first embodiment. When each arm 20 is located at the closed rotational position (refer to the position illustrated with a solid line in FIG. 2), in the wheel 1 of the first embodiment, the first arc wall part 25 of the arm 20 serves as part of the rolling peripheral surface of the wheel 1. In this case, the wheel 1 maintains a circular shape and can perform traveling that is the same as that of a normal wheel. When each arm 20 is located at the opened rotational position (refer to the position illustrated with a dashed and double-dotted line in FIG. 2), in the wheel 1, the leading end part 28 of the click part 23 of the arm 20 protrudes outside the outer peripheral surface 11 of the outer ring 10 in the radial direction. In this case, the wheel 1 can move over a step by grappling the step (refer to FIG. 16 to be described later) with the click part 23 of the arm 20.

Each arm support portion 14 is fixed to the outer ring 10 and thus rotates about the wheel rotational axis $A_W$ together with the outer ring 10. When the arm drive gear 30 rotates at the same rotational speed as that of the outer ring 10 in the same rotational direction as that of the outer ring 10 (does not relatively rotate), the arm drive gear 30 does not rotate relative to the tooth part 24 of each arm 20, and thus the arm 20 is not opened from the closed rotational position. In other words, at flat ground traveling, each arm 20 is maintained at the closed rotational position by controlling the rotational direction and rotational speed of the output shaft of each of the arm actuator 35 and the outer ring actuator 55 so that the arm drive gear 30 and the outer ring 10 rotate at the same rotational speed in the same rotational direction.

When the rotational speed of the arm drive gear 30 in the normal rotational direction R1 is faster than the rotational speed of the outer ring 10, the arm drive gear 30 rotates relative to the tooth part 24 of each arm 20 in the normal rotational direction R1, and thus the arm 20 rotates about the corresponding arm rotational axis $A_A$ in the reverse rotational direction R2. When the arm drive gear 30 rotates by a predetermined angle relative to the outer ring 10 in the normal rotational direction R1, the arm 20 rotates by a predetermined angle about the arm rotational axis $A_A$ in the reverse rotational direction R2 and is opened from the closed rotational position to the opened rotational position. When the rotational speed of the arm drive gear 30 in the normal rotational direction R1 is slower than the rotational speed of the outer ring 10, the arm drive gear 30 rotates relative to the tooth part 24 of each arm 20 in the reverse rotational direction R2, and thus the arm 20 rotates about the corresponding arm rotational axis $A_A$ in the normal rotational direction R1. When the arm drive gear 30 rotates by a predetermined angle relative to the outer ring 10 in the reverse rotational direction R2, the arm 20 rotates by a predetermined angle about the arm rotational axis $A_A$ in the normal rotational direction R1 and is closed from the opened rotational position to the closed rotational position.

When the arm drive gear 30 rotates at the same rotational speed as that of the outer ring 10 in the same rotational direction as that of the outer ring 10 (does not relatively rotate) while each arm 20 is opened at the opened rotational position, the arm 20 is maintained at the opened rotational position. In other words, at step traveling, the rotation of the output shaft of the outer ring actuator 55 is stopped and only the arm actuator 35 is driven, so that each arm 20 is opened at the opened rotational position to transform the wheel 1. After the arm 20 reaches a predetermined transformation amount, the arm 20 is maintained at the opened rotational position by controlling the arm actuator 35 and the outer ring actuator 55 so that the arm drive gear 30 and the outer ring 10 rotate at the same rotational speed in the same rotational direction again.

At the transition to flat ground traveling after step traveling, the rotation of the arm actuator 35 is stopped and only the normal rotation of the outer ring actuator 55 is continued. When the outer ring actuator 55 performs normal rotation while the rotation of the arm actuator 35 is stopped, the outer ring 10 rotates relative to the arm drive gear 30 in the normal rotational direction R1. In other words, the arm drive gear 30 rotates relative to the outer ring 10 in the reverse rotational direction R2. Accordingly, each arm 20 rotates relative to the outer ring 10 in the normal rotational direction R1 and is closed at the closed rotational position. After the arm 20 reaches the closed rotational position, flat ground traveling is performed by driving the arm actuator 35 and the outer ring actuator 55 so that the arm drive gear 30 and the outer ring 10 rotate at the same rotational speed in the same rotational direction.

Note that, detection of a step in the traveling direction is performed by, for example, a detection device provided on the vehicle body side of the self-propelled vehicle on which the wheel 1 is mounted. The detection device includes, for example, a sensor such as an infrared sensor configured to detect the distance to the step. The detection device may include, for example, an image capturing unit configured to capture an image of the step and may detect the step based on the captured image.

As described above, the wheel 1 of the first embodiment includes the outer ring 10, the arm drive gear 30, and the arms 20. The outer ring 10 rotates about the wheel rotational axis $A_W$. The arm drive gear 30 rotates independently from the outer ring 10 about the wheel rotational axis $A_W$. Each arm 20 can rotate about the corresponding arm rotational axis $A_A$ fixed to the outer ring 10. The arm 20 partially protrudes outside the outer peripheral surface 11 of the outer ring 10 in the radial direction as the arm drive gear 30 rotates relative to the outer ring 10 in the normal rotational direction R1. The arm 20 is housed inside the outer peripheral surface 11 of the outer ring 10 in the radial direction as the arm drive gear 30 rotates relative to the outer ring 10 in the reverse rotational direction R2.

At flat ground traveling, each arm 20 of the wheel 1 is housed inside the outer peripheral surface 11 of the outer ring 10 in the radial direction, and accordingly, the outer ring 10 rolls. At flat ground traveling, the outer ring 10 being not transformed rolls, and thus the wheel 1 can maintain stability at flat ground traveling. At step traveling, each arm 20 protrudes outside the outer peripheral surface 11 of the outer ring 10 in the radial direction, and thus the wheel 1 can move over a step by catching the step with the arm 20. Each arm 20 can be opened and housed with a simple structure in which the outer ring 10 and the arm drive gear 30 relatively rotate.

In the wheel 1 of the first embodiment, each arm 20 includes the tooth part 24 that meshes with the arm drive gear 30. With this configuration, the arm 20 rotates in the reverse rotational direction R2 as the arm drive gear 30 rotates relative to the outer ring 10 in the normal rotational direction R1, and the arm 20 rotates in the normal rotational direction R1 as the arm drive gear 30 rotates relative to the outer ring 10 in the reverse rotational direction R2. Accordingly, the structure of a transfer path from a drive source of the arm 20 to the arm 20 is simplified.

In the wheel 1 of the first embodiment, when the arm drive gear 30 does not rotate relative to the outer ring 10, each arm 20 maintains a state of protruding or a state of being housed. Accordingly, unintended transformation of the wheel 1 can be prevented, and thus step traveling and flat ground traveling can be stably performed.

In the wheel 1 of the first embodiment, each arm 20 includes, at part of the outer peripheral surface, the first arc wall part 25 having a convex shape with a curvature center identical to that of the outer ring 10 and with a curvature radius equal to the outer ring 10 in the state of being housed inside the outer peripheral surface 11 of the outer ring 10 in the radial direction. With this configuration, the first arc wall part 25 serves as part of the rolling peripheral surface of the wheel 1, and thus the torque generated by the drive source of the arm 20 can be used at flat ground traveling as well.

In the wheel 1 of the first embodiment, each arm 20 includes, at part of the outer peripheral surface, the second arc wall part 26 having a concave shape partially protruding outside the outer peripheral surface 11 of the outer ring 10 in the radial direction in a state of partially protruding outside the outer peripheral surface 11 of the outer ring 10 in the radial direction. With this configuration, it is possible to more excellently grapple a step with the arm 20 at step traveling.

The wheel 1 of the first embodiment also includes the arm actuator 35, the outer ring gear 16, the outer ring drive gear 50, and the outer ring actuator 55. The arm actuator 35 drives the arm drive gear 30. The outer ring gear 16 rotates integrally with the outer ring 10 about the wheel rotational axis $A_W$. The outer ring drive gear 50 meshes with the outer ring gear 16 and rotates about the arm rotational axis $A_A$ parallel to the wheel rotational axis $A_W$. The outer ring actuator 55 drives independently from the arm actuator 35 and drives the outer ring drive gear 50. With this configuration, the wheel 1 travels with the combined torque of the arm actuator 35 and the outer ring actuator 55 at both flat ground traveling and step traveling, and thus the torque of each actuator can be reduced.

Second Embodiment

The following describes the configuration of a wheel 2 according to a second embodiment with reference to FIGS.

Figure 5:
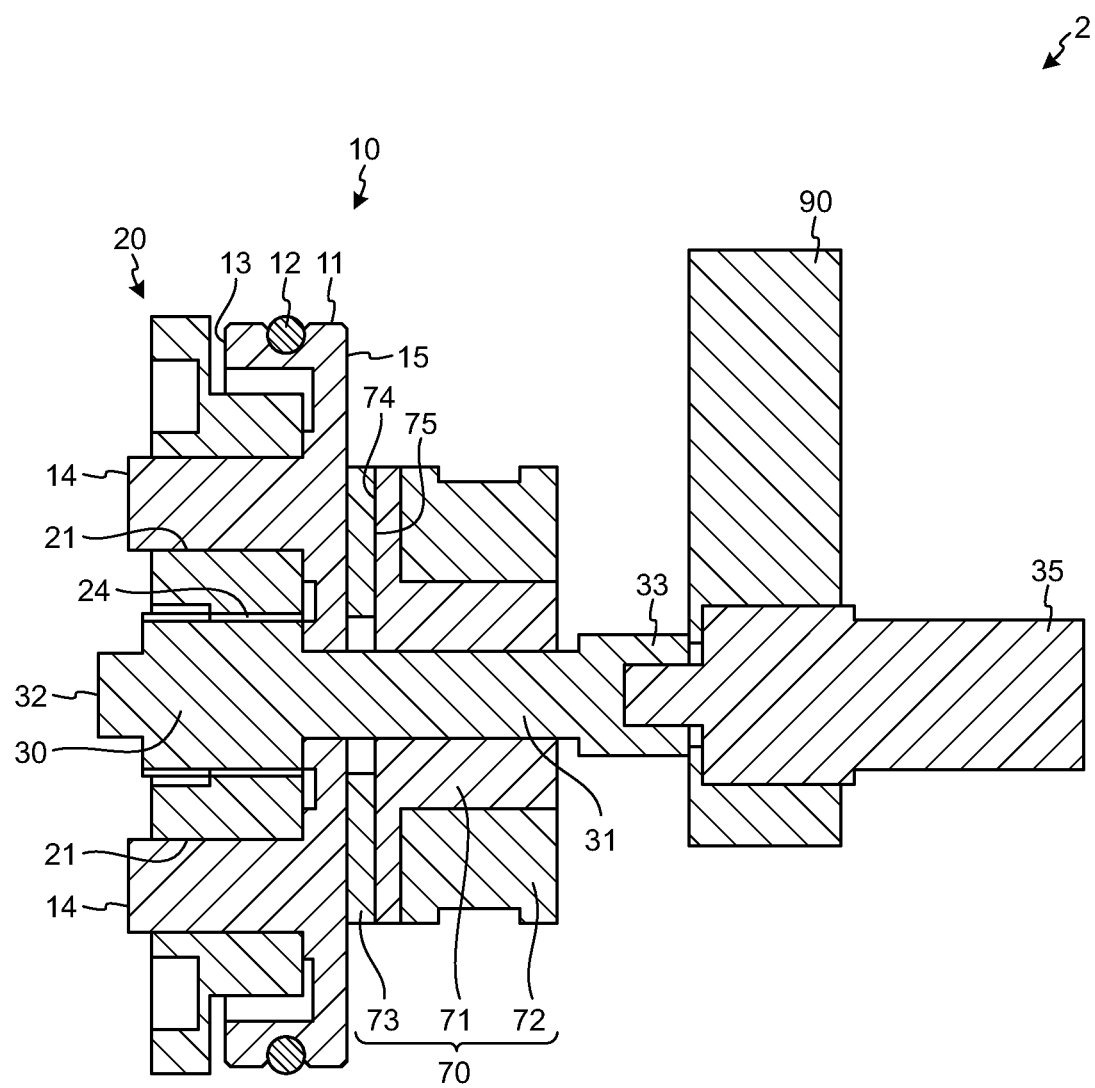
FIG. 5 is a sectional view illustrating the state of a wheel according to a second embodiment at flat ground traveling, taken along a wheel rotational axis.
Figure 6:
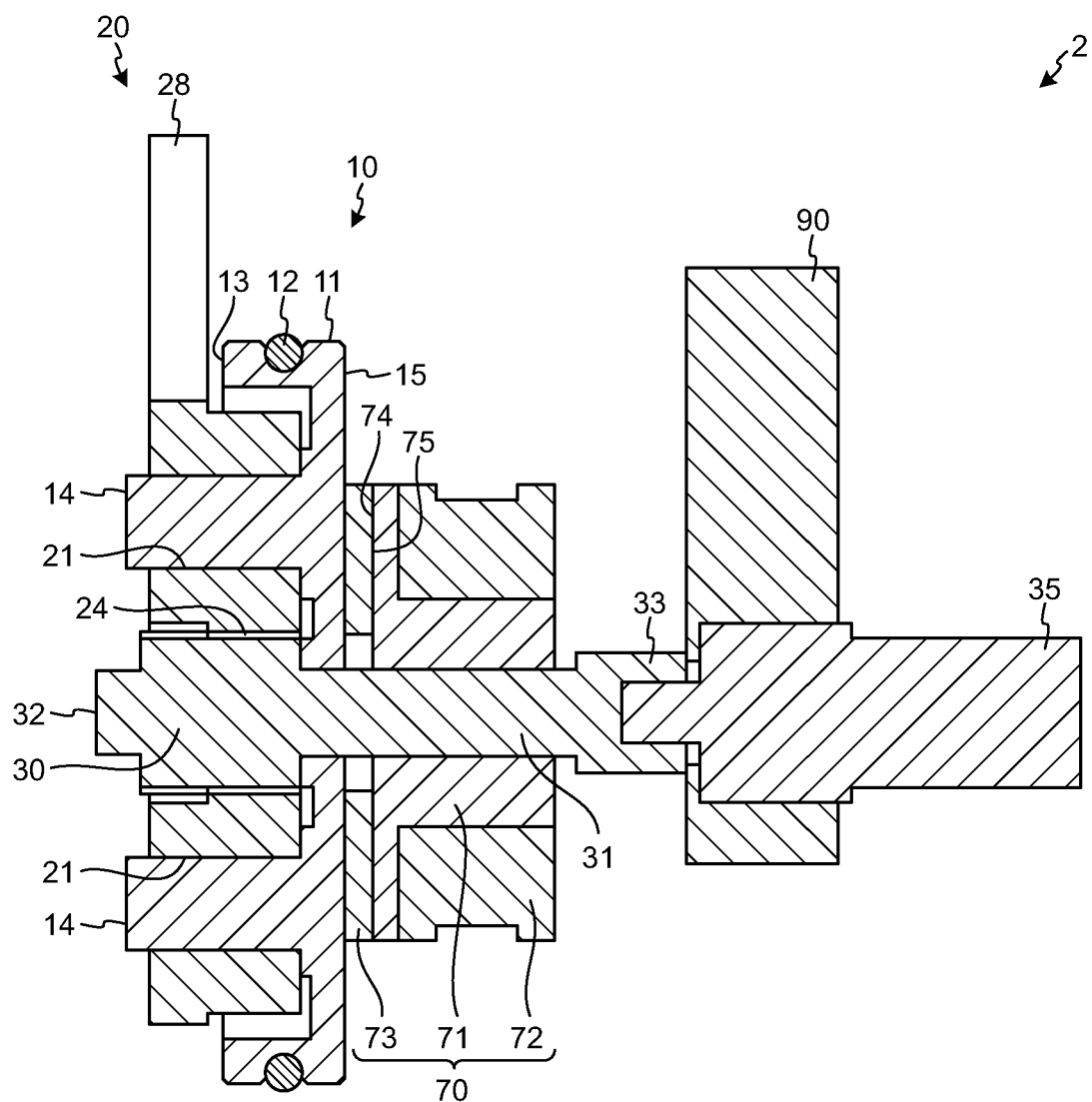
FIG. 6 is a sectional view illustrating the state of the wheel according to the second embodiment at step traveling, taken along the wheel rotational axis.

5 and 6. FIG. 5 is a sectional view illustrating the state of the wheel 2 according to the second embodiment at flat ground traveling, taken along the wheel rotational axis $A_W$. FIG. 6 is a sectional view illustrating the state of the wheel 2 according to the second embodiment at step traveling, taken along the wheel rotational axis $A_W$. In the wheel 2 according to the second embodiment, any component that is the same as that of the wheel 1 according to the first embodiment is denoted by the same reference sign and description thereof is omitted. The wheel 2 according to the second embodiment is different from the wheel 1 according to the first embodiment in that an electromagnetic clutch 70 as a clutch is provided in place of the outer ring gear 16, the outer ring drive gear 50, the outer ring drive shaft 51, and the outer ring actuator 55.

The electromagnetic clutch 70 is disposed on the inside surface 15 side of the outer ring 10. The electromagnetic clutch 70 includes a rotor 71, a stator 72, and an armature 73.

The rotor 71 is provided in a cylindrical shape. The rotor 71 is disposed coaxially with the arm drive shaft 31. The rotor 71 is fixed to the outer peripheral surface of the arm drive shaft 31. The rotor 71 rotates integrally with the arm drive shaft 31.

The stator 72 is provided in a cylindrical shape that is coaxial with the rotor 71. The stator 72 is provided outside the rotor 71 in the radial direction. The stator 72 is fixed to, for example, the support portion 90 (refer to FIG. 3). The stator 72 includes a coil. The stator 72 exerts magnetic force when the coil is energized.

The armature 73 is provided in a circular disk shape with a shaft hole at the center. The armature 73 is fixed to the inside surface 15 of the outer ring 10. An outside surface 74 of the rotor 71 faces an inside surface 75 of the armature 73.

In a state in which the coil of the stator 72 is energized, the magnetic force of the stator 72 attracts the armature 73 through the rotor 71. Accordingly, the outside surface 74 of the rotor 71 and the inside surface 75 of the armature 73 closely contact each other, and thus the torque of the arm drive shaft 31 is transferred to the outer ring 10 through the rotor 71 and the armature 73.

In a state in which the coil of the stator 72 is not energized, the stator 72 does not exert magnetic force nor attract the armature 73 through the rotor 71. Accordingly, the outside surface 74 of the rotor 71 and the inside surface 75 of the armature 73 are separated from each other, and thus the torque of the arm drive shaft 31 is not transferred to the outer ring 10.

The following describes the actuation of the wheel 2 of the second embodiment. Similarly to the wheel 1 of the first embodiment, in the wheel 2 of the second embodiment, the first arc wall part 25 of each arm 20 serves as a rolling peripheral surface of the wheel 2 when the arm 20 is located at the closed rotational position. In this case, the wheel 2 maintains a circular shape and can perform traveling that is the same as that of a normal wheel. In the wheel 2, the leading end part 28 of the click part 23 of each arm 20 protrudes outside the outer peripheral surface 11 of the outer ring 10 in the radial direction when the arm 20 is located at the opened rotational position. In this case, the wheel 2 can move over a step by grappling the step with the click part 23 of the arm 20.

In a state in which the coil of the stator 72 of the electromagnetic clutch 70 is energized, the torque of the arm drive shaft 31 is transferred to the outer ring 10. Specifically, the arm drive gear 30 and the outer ring 10 rotate at the same rotational speed in the same rotational direction. In this case, the arm drive gear 30 does not rotate relative to the tooth part 24 of each arm 20, and thus the arm 20 is maintained at the closed rotational position.

In a state in which the coil of the stator 72 is not energized, the torque of the arm drive shaft 31 is not transferred to the outer ring 10. Specifically, when the arm drive shaft 31 is rotated in the normal rotational direction R1 while the coil of the stator 72 is not energized, the arm drive gear 30 rotates relative to the outer ring 10 and the tooth part 24 of each arm 20 in the normal rotational direction R1. Accordingly, the arm 20 rotates about the arm rotational axis $A_A$ in the reverse rotational direction R2. When the arm drive gear 30 rotates by a predetermined angle relative to the outer ring 10 in the normal rotational direction R1, the arm 20 rotates by a predetermined angle about the arm rotational axis $A_A$ in the reverse rotational direction R2 and is opened from the closed rotational position to the opened rotational position. When the arm drive shaft 31 is rotated in the reverse rotational direction R2 while the coil of the stator 72 is not energized, the arm drive gear 30 rotates relative to the outer ring 10 and the tooth part 24 of each arm 20 in the reverse rotational direction R2. Accordingly, the arm 20 rotates about the arm rotational axis $A_A$ in the normal rotational direction R1. When the arm drive gear 30 rotates by a predetermined angle relative to the outer ring 10 in the reverse rotational direction R2, the arm 20 rotates by a predetermined angle about the arm rotational axis $A_A$ in the normal rotational direction R1 and is closed from the opened rotational position to the closed rotational position.

Each arm 20 is maintained at the opened rotational position when the arm drive gear 30 rotates at the same rotational speed as that of the outer ring 10 in the same rotational direction as that of the outer ring 10 in a state in which the arm 20 is opened at the opened rotational position. Specifically, at step traveling, the arm 20 is opened at the opened rotational position to transform the wheel 2 by stopping energization to the coil of the stator 72 of the electromagnetic clutch 70 and stopping transfer of the torque of the arm drive shaft 31 to the outer ring 10 by the arm actuator 35. After the arm 20 reaches a predetermined transformation amount, the arm 20 is maintained at the opened rotational position by resuming energization to the coil of the stator 72 of the electromagnetic clutch 70 so that the arm drive gear 30 and the outer ring 10 rotate at the same rotational speed in the same rotational direction again.

At the transition to flat ground traveling after step traveling, energization to the coil of the stator 72 of the electromagnetic clutch 70 is stopped first to cancel coupling between the rotor 71 and the armature 73, thereby stopping transfer of the torque of the arm drive shaft 31 to the outer ring 10. Subsequently, the arm drive gear 30 is rotated in the reverse rotational direction R2 in a state in which the torque transfer to the outer ring 10 is stopped. In other words, the arm drive gear 30 rotates relative to the outer ring 10 in the reverse rotational direction R2. Accordingly, each arm 20 rotates relative to the outer ring 10 in the normal rotational direction R1 and is located at the closed rotational position. After the arm 20 reaches the closed rotational position, the arm actuator 35 and the outer ring actuator 55 are driven to perform flat ground traveling.

Note that, the actuation of the electromagnetic clutch 70 is not limited to the above description. The electromagnetic clutch 70 may have, for example, a configuration with which the torque of the arm drive shaft 31 is not transferred to the outer ring 10 in a state in which the coil of the stator 72 of the electromagnetic clutch 70 is energized but the torque of the arm drive shaft 31 is transferred to the outer ring 10 in a state in which the coil of the stator 72 is not energized. The electromagnetic clutch 70 may have any configuration with which the electromagnetic clutch 70 can switch between a state in which power of the arm actuator 35 is transferred to the outer ring 10 and a state in which power of the arm actuator 35 is not transferred to the outer ring 10, depending on existence of energization.

As described above, the wheel 2 of the second embodiment includes the arm actuator 35 configured to drive the arm drive gear 30, and the electromagnetic clutch 70 capable of switching between the state in which power of the arm actuator 35 is transferred to the outer ring 10 and the state in which power of the arm actuator 35 is not transferred to the outer ring 10, depending on existence of energization.

Although the two actuators (the arm actuator 35 and the outer ring actuator 55) need to be synchronized in the wheel 1 of the first embodiment, the wheel 2 of the second embodiment includes only one actuator and thus does not need to synchronize a plurality of actuators. Specifically, in a state in which the electromagnetic clutch 70 is energized, each arm 20 can maintain an opened state or a housed state. In a state in which the electromagnetic clutch 70 is not energized, opening operation or housing operation of each arm 20 is possible, depending on the rotational direction of the arm drive gear 30. Thus, the wheel 2 can be easily controlled.

Third Embodiment

Figure 7:
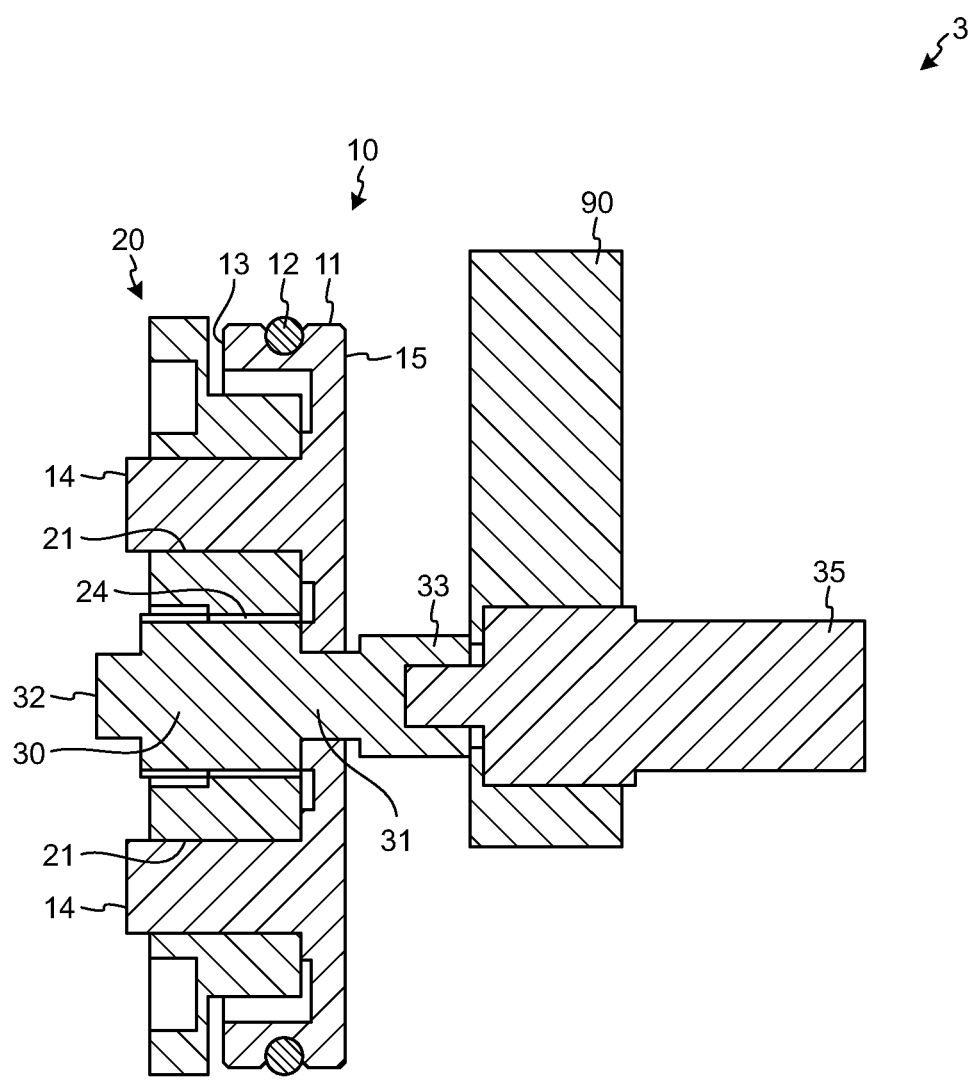
FIG. 7 is a sectional view illustrating the state of a wheel according to a third embodiment at flat ground traveling, taken along the wheel rotational axis.
Figure 8:
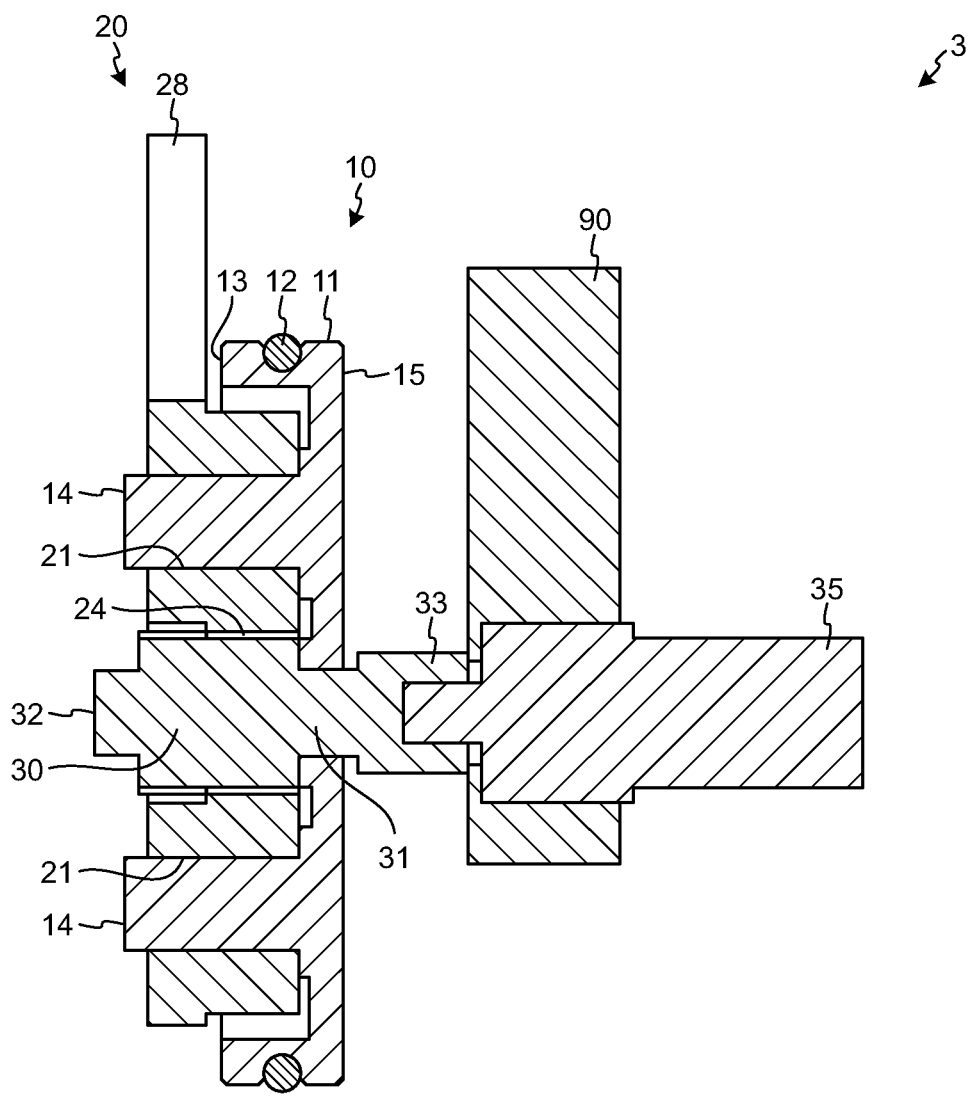
FIG. 8 is a sectional view illustrating the state of the wheel according to the third embodiment at step traveling, taken along the wheel rotational axis.

The following describes the configuration of a wheel 3 according to a third embodiment with reference to FIGS. 7 and 8. FIG. 7 is a sectional view illustrating the state of the wheel 3 according to the third embodiment at flat ground traveling, taken along the wheel rotational axis $A_W$. FIG. 8 is a sectional view illustrating the state of the wheel 3 according to the third embodiment at step traveling, taken along the wheel rotational axis $A_W$. In the wheel 3 according to the third embodiment, any component that is the same as that of the wheel 2 according to the second embodiment is denoted by the same reference sign and description thereof is omitted. The wheel 3 according to the third embodiment is different from the wheel 2 according to the second embodiment in that the electromagnetic clutch 70 is not provided.

Although the two actuators (the arm actuator 35 and the outer ring actuator 55) need to be synchronized in the wheel 1 of the first embodiment, the wheel 3 of the third embodiment includes only one actuator and thus does not need to perform synchronization. As the arm drive gear 30 rotates in the normal rotational direction R1, each arm 20 is opened until the stopping part 29 contacts the base end circular part 22 of the arm 20 adjacent to the reverse rotational direction R2 side, and then the outer ring 10 rotates integrally with the arm drive gear 30 in the normal rotational direction R1. The stopping part 29 functions as a stopper in the reverse rotational direction R2, which restricts the rotation range of the arm 20 in the reverse rotational direction R2. As the arm drive gear 30 rotates in the reverse rotational direction R2, each arm 20 is closed and housed until the base end side wall part 27 contacts the leading end part 28 of the arm 20 adjacent to the reverse rotational direction R2 side, and then the outer ring 10 rotates integrally with the arm drive gear 30 in the reverse rotational direction R2. The base end side wall part 27 functions as a stopper in the normal rotational direction R1, which restricts the rotation range of the arm 20 in the normal rotational direction R1.

The following describes actuation of the wheel 3 of the third embodiment. Similarly to the wheel 1 of the first embodiment and the wheel 2 of the second embodiment, in the wheel 3 of the third embodiment, the first arc wall part 25 of each arm 20 serves as a rolling peripheral surface of the wheel 3 when the arm 20 is located at the closed rotational position. In this case, the wheel 3 maintains a circular shape and can perform traveling that is the same as that of a normal wheel. In the wheel 3, the leading end part 28 of the click part 23 of each arm 20 protrudes outside the outer peripheral surface 11 of the outer ring 10 in the radial direction when the arm 20 is located at the opened rotational position. In this case, the wheel 3 can move over a step by grappling the step with the click part 23 of the arm 20.

As the arm drive shaft 31 is rotated in the normal rotational direction R1, the arm drive gear 30 rotates relative to the outer ring 10 and the tooth part 24 of each arm 20 in the normal rotational direction R1, and accordingly, the arm 20 rotates about the arm rotational axis $A_A$ in the reverse rotational direction R2. When the arm drive gear 30 rotates by a predetermined angle relative to the outer ring 10 in the normal rotational direction R1, each arm 20 rotates by a predetermined amount about the arm rotational axis $A_A$ in the reverse rotational direction R2 and is opened from the closed rotational position to the opened rotational position. Since the stopping part 29 contacts the base end circular part 22 of the arm 20 adjacent to the reverse rotational direction R2 side, the arm 20 cannot further rotate in the reverse rotational direction R2 and is maintained at the opened rotational position. The wheel 3 can perform step traveling in the state of being maintained at the opened rotational position. The traveling direction is a direction in which the arm drive shaft 31 rotates in the normal rotational direction R1.

At the transition to flat ground traveling after step traveling, the orientation of the wheel 3 is first rotated by 180°. Specifically, the forward direction at step traveling is set to be a direction in which the wheel 3 proceeds when rotating in the reverse rotational direction R2. When the arm drive shaft 31 is rotated in the reverse rotational direction R2 in this state, the arm drive gear 30 rotates relative to the outer ring 10 and the tooth part 24 of each arm 20 in the reverse rotational direction R2, and accordingly, the arm 20 rotates about the arm rotational axis $A_A$ in the normal rotational direction R1. When the arm drive gear 30 rotates by a predetermined angle relative to the outer ring 10 in the reverse rotational direction R2, the arm 20 rotates about the arm rotational axis $A_A$ in the normal rotational direction R1 and is closed from the opened rotational position to the closed rotational position. Since the base end side wall part 27 contacts the leading end part 28 of the arm 20 adjacent to the reverse rotational direction R2 side, the arm 20 cannot further rotate in the normal rotational direction R1 and is maintained at the closed rotational position. Accordingly, flat ground traveling becomes possible.

The shape of the wheel 3 of the third embodiment transforms, depending on the rotational direction of the arm actuator 35, so that step traveling is performed in a case of rotation in the normal rotational direction R1 and flat ground traveling is performed in a case of rotation in the reverse rotational direction R2. Thus, flat ground traveling and step traveling can be performed with a simpler structure. The wheel 3 of the third embodiment needs to be provided with positioning only in forward traveling direction or backward traveling direction, and thus is preferably applied to a vehicle such as a truck driven by a person.

As described above, the wheel 3 of the third embodiment includes the arm actuator 35 configured to drive the arm drive gear 30, a first stopper in the normal rotational direction R1 (the base end side wall part 27), which restricts the rotation range of the corresponding arm 20 in the normal rotational direction R1, and a second stopper in the reverse rotational direction R2 (the stopping part 29), which restricts the rotation range of the arm in the reverse rotational direction R2.

With this configuration, unintended transformation of the wheel 3 can be prevented, and thus step traveling and flat ground traveling can be stably performed. Moreover, the arm 20 is relatively fixed to the outer ring 10 through the first stopper and the arm rotational axis $A_A$ when the arm drive shaft 31 rotates in the reverse rotational direction R2 while the first stopper (base end side wall part 27) contacts the leading end part 28 of the arm 20 adjacent to the reverse rotational direction R2 side. With this configuration, the torque of the arm drive shaft 31 is transferred to the outer ring 10 in a state in which the arm 20 is at the closed rotational position, and thus the torque generated by the drive source of the arm 20 can be used at flat ground traveling as well. In addition, the arm 20 is relatively fixed to the outer ring 10 through the second stopper and the arm rotational axis $A_A$ when the arm drive shaft 31 rotates in the normal rotational direction R1 while the second stopper (stopping part 29) contacts the base end circular part 22 of the arm 20 adjacent to the reverse rotational direction R2 side. With this configuration, the torque of the arm drive shaft 31 is transferred to the outer ring 10 in a state in which the arm 20 is at the opened rotational position, and thus the torque generated by the drive source of the arm 20 can be excellently used for step traveling.

Fourth Embodiment

Figure 9:
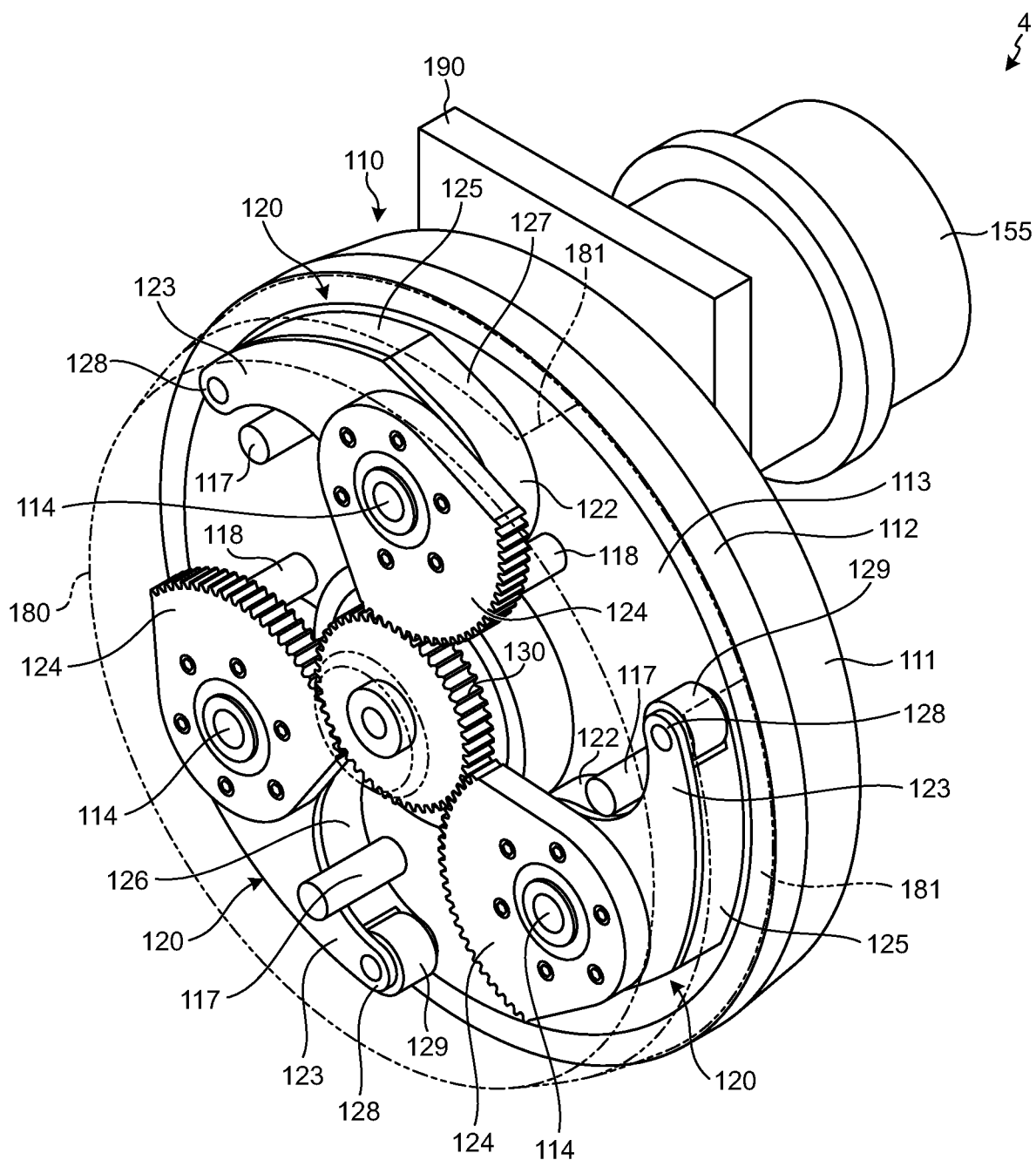
FIG. 9 is a perspective view illustrating the state of a wheel according to a fourth embodiment at flat ground traveling.
Figure 10:
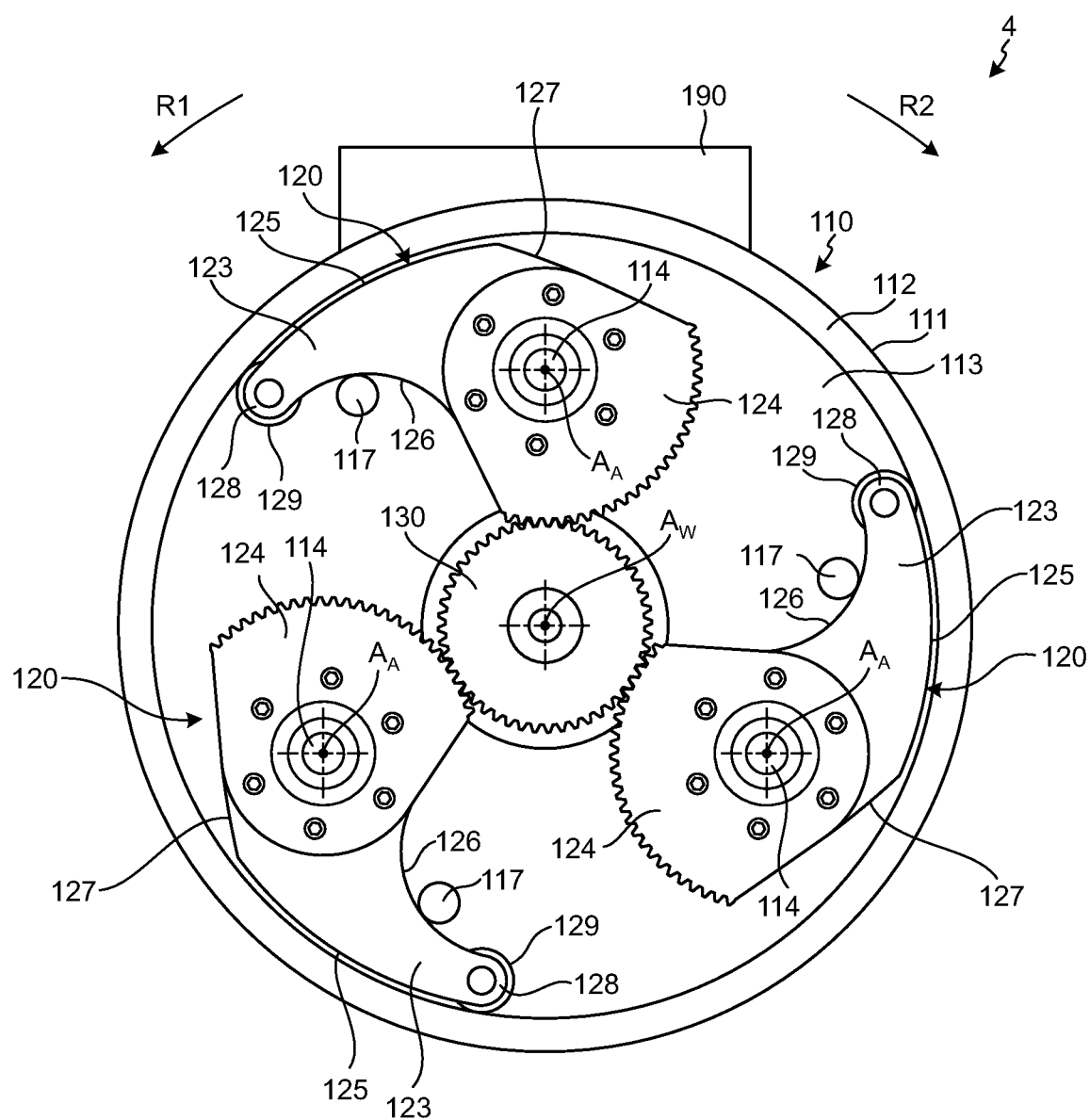
FIG. 10 is a side view of the wheel in FIG. 9.
Figure 11:
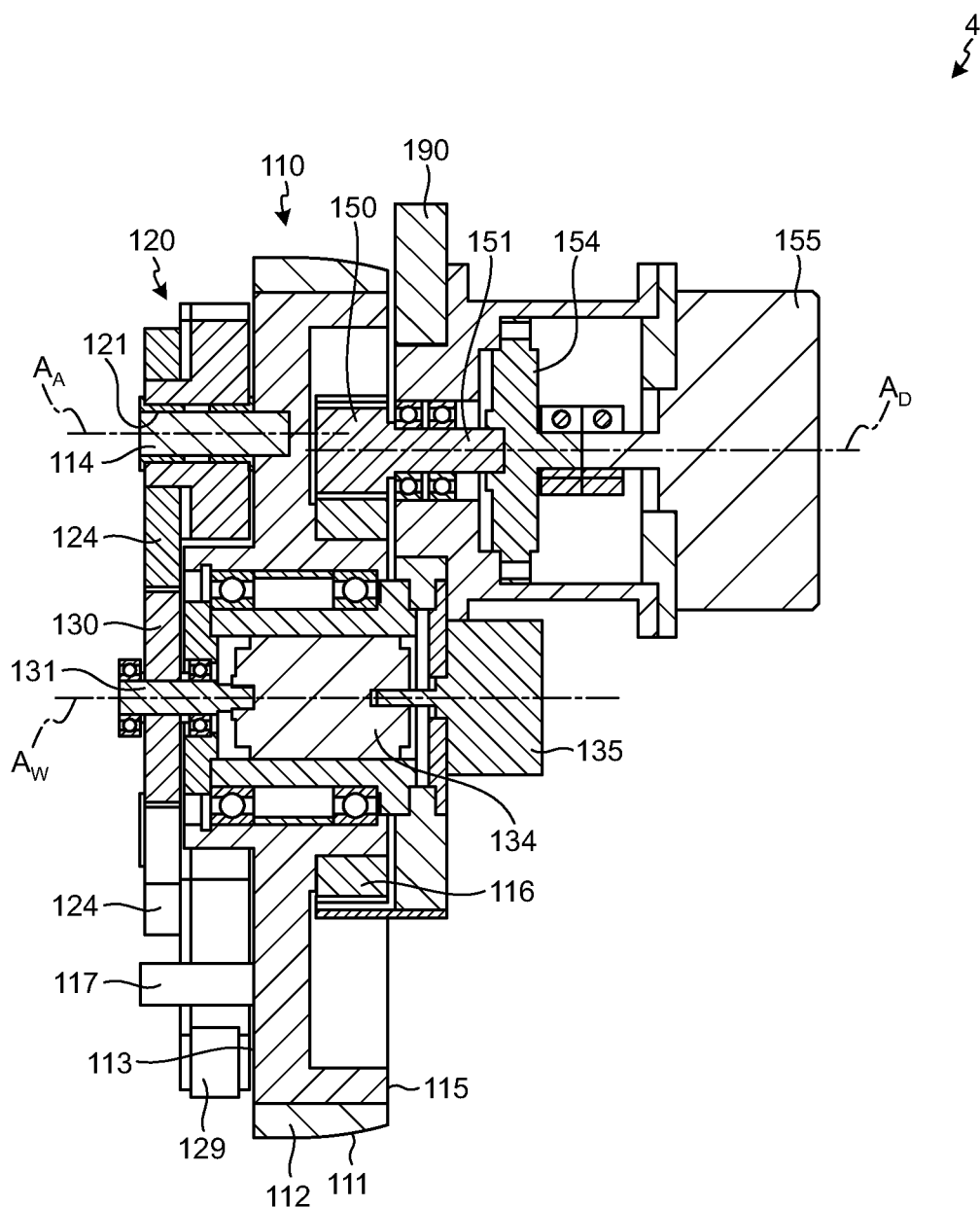
FIG. 11 is a sectional view of the wheel in FIG. 9, taken along the wheel rotational axis.
Figure 12:
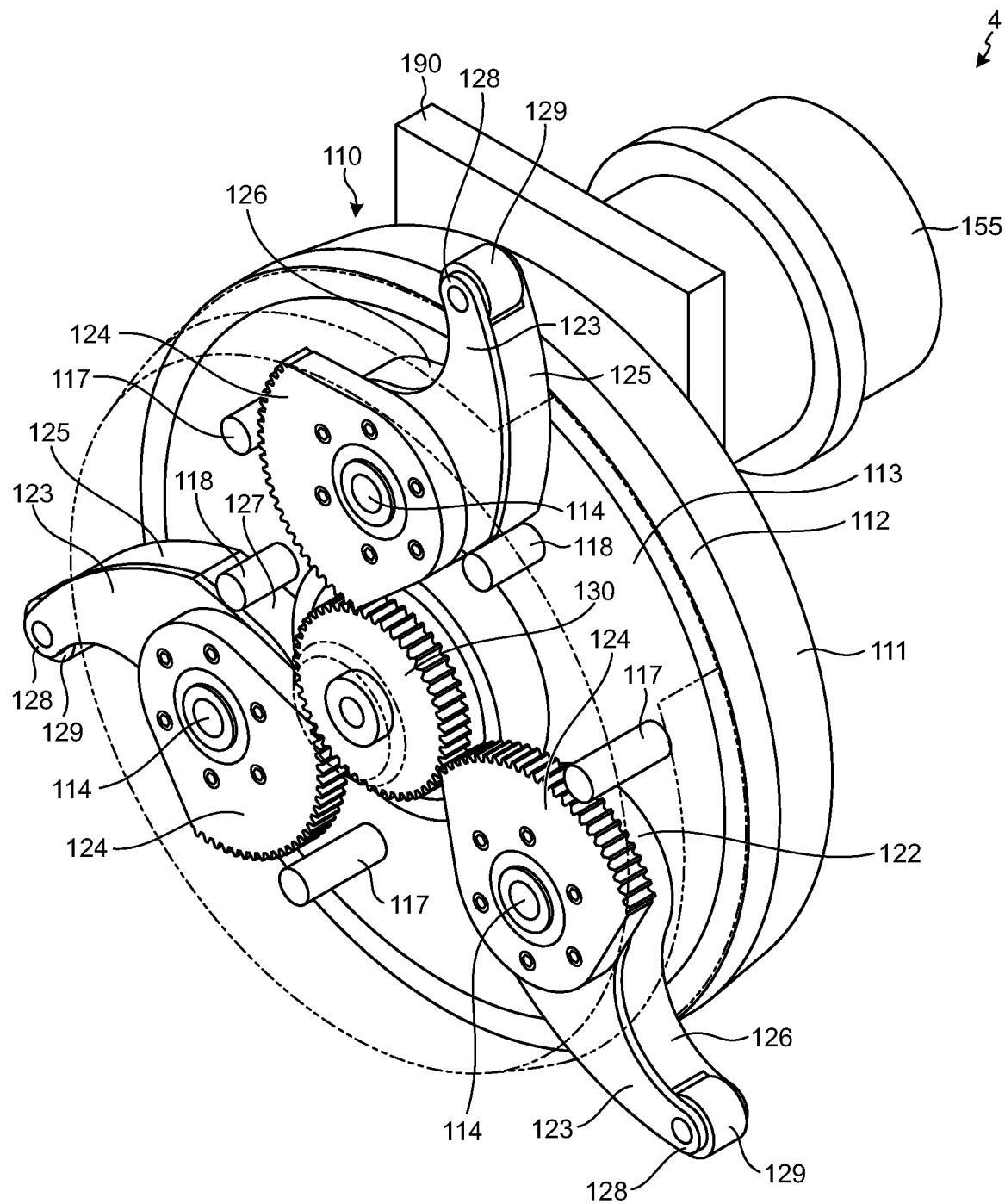
FIG. 12 is a perspective view illustrating the state of the wheel according to the fourth embodiment at step traveling.
Figure 13:
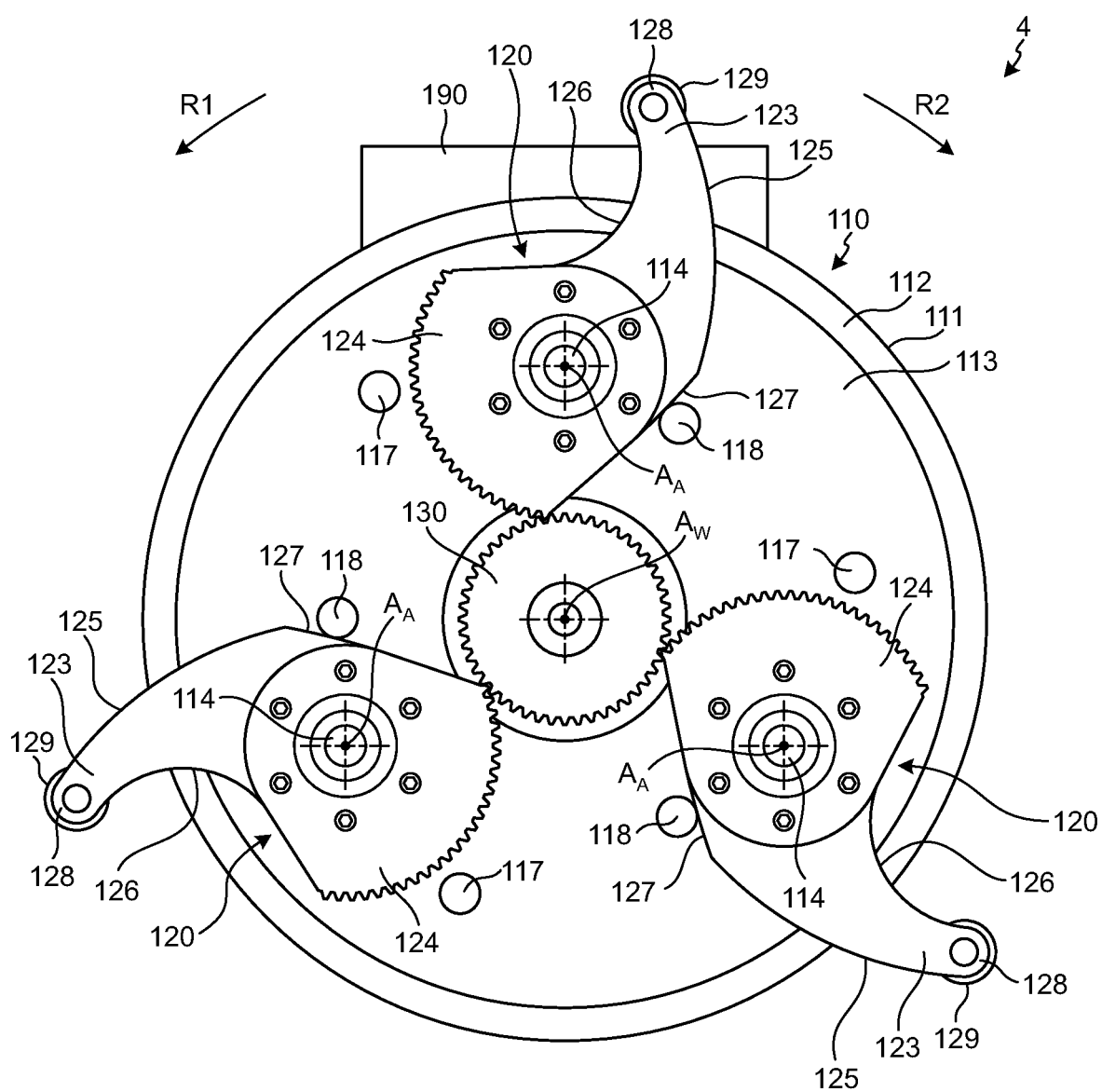
FIG. 13 is a side view of the wheel in FIG. 12.
Figure 14:
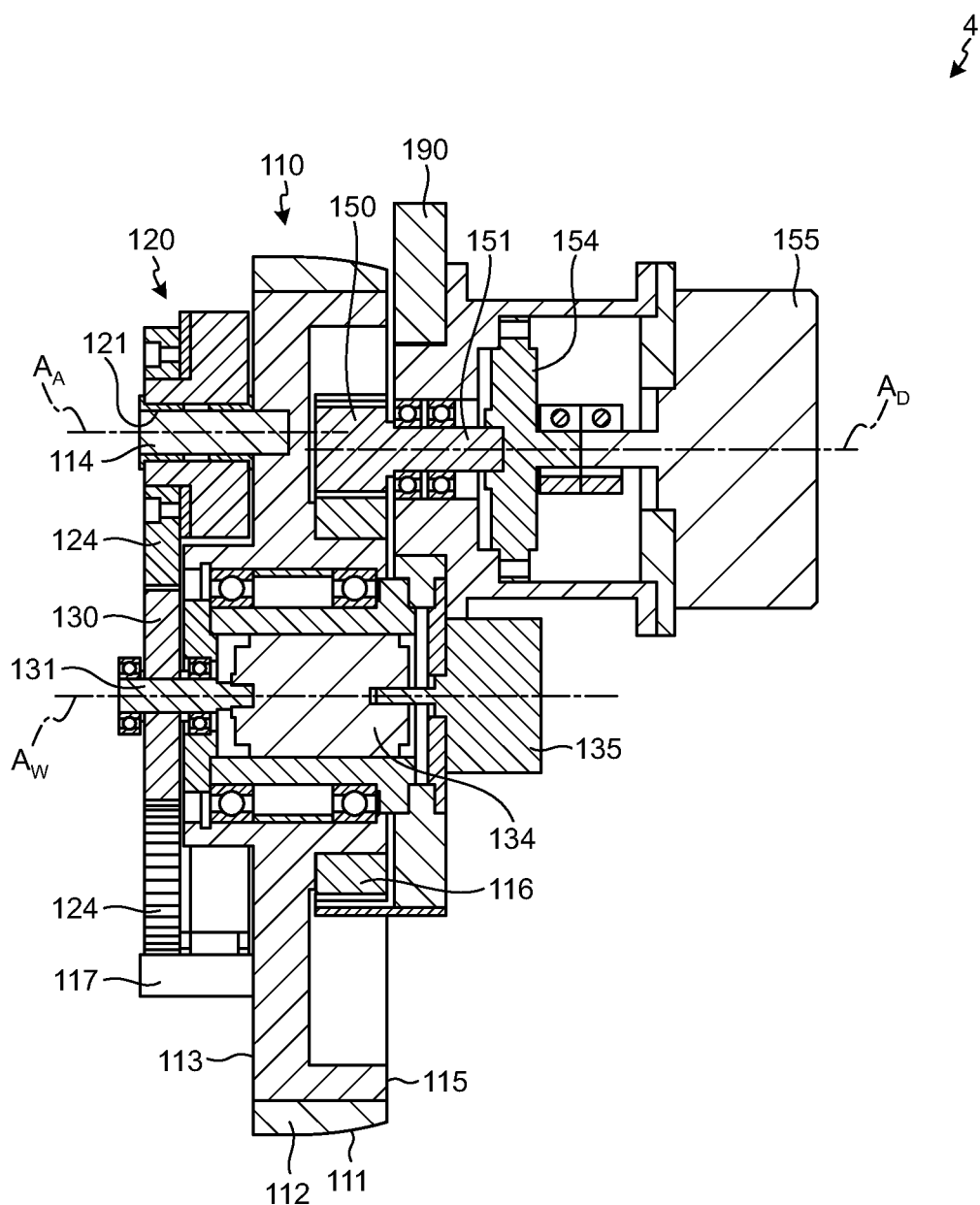
FIG. 14 is a sectional view of the wheel in FIG. 13, taken along the wheel rotational axis.

The following describes the configuration of a wheel 4 according to a fourth embodiment with reference to FIGS. 9 to 14. FIG. 9 is a perspective view illustrating the state of the wheel 4 according to the fourth embodiment at flat ground traveling. FIG. 10 is a front view of the wheel 4 in FIG. 9. FIG. 11 is a sectional view of the wheel 4 in FIG. 9, taken along the wheel rotational axis $A_W$. FIG. 12 is a perspective view illustrating the state of the wheel 4 according to the fourth embodiment at step traveling. FIG. 13 is a front view of the wheel 4 in FIG. 12. FIG. 14 is a sectional view of the wheel 4 in FIG. 13, taken along the wheel rotational axis $A_W$. Note that, a cover 180 to be described later is omitted in FIGS. 10, 11, 13, and 14.

In the following description related to the wheel 4 of the fourth embodiment, description of any component having a function that is the same as that of the wheel 1 of the first embodiment is omitted as appropriate. The wheel 4 includes an outer ring 110, an arm 120, an arm drive gear 130, an outer ring drive gear 150, the cover 180, and a support portion 190.

The outer ring 110 has a circular disk shape with a central axis at the wheel rotational axis $A_W$ of the wheel 4. The outer ring 110 has, at the center, a hole into which an arm drive shaft 131 to be described later is inserted. The outer ring 110 includes, across an outer peripheral surface 111 in the direction of the wheel rotational axis $A_W$, a tire portion 112 having a ring shape and attached in the circumferential direction of the outer peripheral surface 111. The entire circumference of the tire portion 112 serves as a rolling peripheral surface of the wheel 4. The tire portion 112 is formed of, for example, rubber and absorbs impact on the outer ring 110 from an installation surface at traveling.

Three arms 120 are disposed on an outside surface 113 side of the outer ring 110. Note that, the outside surface 113 of the outer ring 110 is a side surface that faces outside a vehicle body when the wheel 4 is mounted on a self-propelled vehicle. The outer ring 110 includes three arm support portions 114 that support the three arms 120 rotatably about the respective arm rotational axes $A_A$. Conditions on the direction of each arm rotational axis $A_A$ and the positional relation thereof with the wheel rotational axis $A_W$ are the same as in the first embodiment. The configuration of the arm support portions 114 is the same as that of the arm support portions 14 of the first embodiment except that the number thereof is not four but three, and thus the description thereof is omitted.

A concave part toward the outside surface 113 is provided at an inside surface 115 side that is a side surface of the outer ring 110, which is opposite to the outside surface 113. An outer ring gear 116 that has a rotational axis identical to the wheel rotational axis $A_W$ of the wheel 4 and rotates integrally with the outer ring 110 is disposed at the concave part (refer to FIGS. 11 and 14).

In addition, a first stopper 117 and a second stopper 118 that restrict the rotation range of the corresponding arm 120, which will be described later, are provided on the outside surface 113 side of the outer ring 110. The first stopper 117 contacts a second arc wall part 126 of the arm 120 at the closed rotational position. The first stopper 117 restricts the rotation range of the arm 120 in the normal rotational direction R1 so that the arm 120 does not rotate beyond the closed rotational position in the normal rotational direction R1. The second stopper 118 contacts a straight wall part 127 of the arm 120 at the opened rotational position. The second stopper 118 restricts the rotation range of the arm 120 in the reverse rotational direction R2 so that the arm 120 does not rotate beyond the opened rotational position in the reverse rotational direction R2. The first stopper 117 and the second stopper 118 are shaft members provided as protrusions from the outside surface 113 of the outer ring 110 in the fourth embodiment.

In the fourth embodiment, the three arms 120 are provided to one wheel 4. The arms 120 are supported rotatably about the arm rotational axes $A_A$, respectively, by the arm support portions 114 inserted into shaft holes 121 (refer to FIGS. 10 and 13). Each arm 120 can rotate about the corresponding arm rotational axis $A_A$ between the closed rotational position illustrated in FIGS. 9, 10, and 11 and the opened rotational position illustrated in FIGS. 12, 13, and 14. Each arm 120 includes a base end part 122 and a click part 123. Each arm 120 has an outer peripheral surface formed by a gear part 124, a first arc wall part 125, the second arc wall part 126, and the straight wall part 127 when viewed in the direction of the wheel rotational axis $A_W$.

The base end part 122 is a part near the rotation center of the arm 120 and includes the corresponding shaft hole 121. The click part 123 is provided as a protrusion in the radial direction of the base end part 122. At the closed rotational position, the click part 123 is housed inside the outer peripheral surface 111 of the outer ring 110 in the radial direction. At the opened rotational position, a leading end part 128 of the click part 123 protrudes outside the outer peripheral surface 111 of the outer ring 110 in the radial direction. In the fourth embodiment, the gear part 124 is fixed on an outside surface side of the base end part 122. Note that, the gear part 124 may be formed integrally with the base end part 122. The gear part 124 includes, at part of its outer periphery, a tooth part that meshes with the arm drive gear 130 to be described later.

The first arc wall part 125 is part of the outer peripheral surface of the click part 123 and has a convex arc shape. An end part of the first arc wall part 125 on the normal rotational direction R1 side is the leading end part 128 of the click part 123. The second arc wall part 126 is part of the outer peripheral surface of the click part 123 and has a concave arc shape. One end of the second arc wall part 126 is the leading end part 128 of the click part 123. The second arc wall part 126 is adjacent to the first arc wall part 125 through the leading end part 128. The other end of the second arc wall part 126 connects to the base end part 122. The second arc wall part 126 curves in the same direction as that of the first arc wall part 125. The second arc wall part 126 contacts the first stopper 117 at the closed rotational position. The rotation range of the arm 120 in the normal rotational direction R1 is restricted so that the arm 120 does not rotate in the normal rotational direction R1 beyond the closed rotational position at which the second arc wall part 126 contacts the first stopper 117.

One end of the straight wall part 127 connects to the base end part 122. The other end of the straight wall part 127 is adjacent to an end part of the first arc wall part 125 on the reverse rotational direction R2 side. The straight wall part 127 contacts the second stopper 118 at the opened rotational position. The rotation range of the arm 120 in the reverse rotational direction R2 is restricted so that the arm 120 does not rotate in the reverse rotational direction R2 beyond the opened rotational position at which the straight wall part 127 contacts the second stopper 118.

The leading end part 128 is formed between the first arc wall part 125 and the second arc wall part 126. The arm 120 is formed in a shape that gradually narrows from the base end part 122 side toward the leading end part 128 of the click part 123. A small wheel 129 supported rotatably about a rotational axis parallel to the wheel rotational axis $A_W$ and the arm rotational axis $A_A$ is attached to the leading end part 128. Part of the outer peripheral surface of the small wheel 129 is positioned outside the outer peripheral surface of the click part 123 in the radial direction of the small wheel 129.

As illustrated in FIGS. 11 and 14, the arm drive gear 130 is an outer gear having a rotational axis that is coaxial with the wheel rotational axis $A_W$ of the wheel 4. The arm drive gear 130 meshes with the tooth parts of the gear parts 124 of the three arms 120.

The arm drive gear 130 rotates integrally with the arm drive shaft 131. In the fourth embodiment, the arm drive gear 130 is provided integrally with the arm drive shaft 131 but may be provided separately from the arm drive shaft 131 and fixed to the arm drive shaft 131. The arm drive shaft 131 is a shaft member having a rotational axis that is coaxial with the wheel rotational axis $A_W$ of the wheel 4. The arm drive shaft 131 is inserted into a hole formed at the center of the outer ring 110. The arm drive gear 130 and the arm drive shaft 131 rotate independently from the outer ring 110. The arm drive shaft 131 connects to an output shaft of an arm actuator 135 through an arm decelerator 134. The arm decelerator 134 decelerates the rotation of the output shaft of the arm actuator 135, amplifies the torque, and transfers the torque to the arm drive shaft 131. The arm actuator 135 has a configuration and functions that are the same as those of the arm actuator 35 of the first embodiment, and thus description thereof is omitted.

As illustrated in FIGS. 11 and 14, the outer ring drive gear 150 is an outer gear having a rotational axis at the outer ring drive rotational axis $A_D$ parallel to the wheel rotational axis $A_W$ of the wheel 4 and the rotational axis of the outer ring gear 116. The outer ring drive rotational axis $A_D$ may be coaxial with one of the arm rotational axes $A_A$ or may be an axis different from all arm rotational axes $A_A$. The outer ring drive gear 150 is disposed at a concave part provided on the inside surface 115 side of the outer ring 110. The outer ring drive gear 150 meshes with the outer ring gear 116. The outer ring drive gear 150 rotates in a direction opposite to the rotational direction of the outer ring gear 116.

The outer ring drive gear 150 rotates integrally with an outer ring drive shaft 151. The outer ring drive gear 150 is provided integrally with the outer ring drive shaft 151 in the fourth embodiment but may be provided separately from the outer ring drive shaft 151 and fixed to the outer ring drive shaft 151. The outer ring drive shaft 151 is a shaft member having a rotational axis at the outer ring drive rotational axis $A_D$. The outer ring drive shaft 151 connects to an output shaft of an outer ring actuator 155 through an outer ring decelerator 154. The outer ring decelerator 154 decelerates the rotation of the output shaft of the outer ring actuator 155, amplifies the torque, and transfers the torque to the outer ring drive shaft 151. The outer ring actuator 155 has a configuration and functions that are the same as those of the outer ring actuator 55 of the first embodiment, and thus the description is omitted.

The cover 180 is a lid member that covers an outside surface side of the wheel 4. The cover 180 includes, at its outer periphery, an opening part 181 for the corresponding arm 120 to protrude at the opened rotational position. The support portion 190 has a configuration and functions that are the same as those of the support portion 90 of the first embodiment, and thus the description is omitted.

The following describes the actuation of the wheel 4 of the fourth embodiment. The actuation of the wheel 4 of the fourth embodiment is the same as the actuation of the wheel 1 of the first embodiment except that each arm 120 and the outer ring 110 are driven through the arm decelerator 134 and the outer ring decelerator 154.

Specifically, in the wheel 4 of the fourth embodiment, the leading end part 128 of the click part 123 of each arm 120 is housed inside the outer peripheral surface 111 of the outer ring 110 in the radial direction when the arm 120 is located at the closed rotational position (refer to the position illustrated in FIGS. 9, 10, and 11). In this case, the wheel 4 maintains a circular shape and can perform traveling that is the same as that of a normal wheel. In the wheel 4, the leading end part 128 of the click part 123 of each arm 120 protrudes outside the outer peripheral surface 111 of the outer ring 110 in the radial direction when the arm 120 is located at the opened rotational position (refer to the position illustrated in FIGS. 12, 13, and 14). In this case, the wheel 4 can move over a step (refer to FIG. 16 to be described later) by grappling the step with the click part 123 of the arm 120.

Application Form

The following describes the configuration of a vehicle 200 as an exemplary application of the wheels 1, 2, and 3 with reference to FIG. 15. FIG. 15 is a perspective view schematically illustrating an exemplary configuration of the vehicle 200 as an exemplary application on which the wheel 1 according to the first embodiment is mounted.

The vehicle 200 as an application form is a truck including the vehicle body 201 of the vehicle 200 and the four wheels 1. For example, a power source of electric power supplied to the arm actuator 35 and the outer ring actuator 55, a detection device configured to detect a step in the traveling direction, and a control device configured to control the rotational direction and rotational speed of each of the arm actuator 35 and the outer ring actuator 55 (not illustrated) are mounted on the vehicle body 201.

Each of the four wheels 1 is fixed to the vehicle body 201 through the corresponding support portion 90. The four wheels 1 are disposed at the right, left, front, and rear parts of the vehicle body 201. With this configuration, the wheel rotational axis $A_W$ of each wheel 1 is fixed to the vehicle body 201. In each wheel 1 in the application form, an upper end part of the support portion 90 is fixed to the lower surface of the vehicle body 201. Although the four wheels 1 are disposed at the right, left, front, and rear parts of the vehicle 200 in the application form, three or more wheels 1 may be provided when the wheels 1 are applied to a self-propelled vehicle. The vehicle 200 is rotated in the right-left direction not by using a steering device for steering but by using a rotational speed difference between the wheel 1 on the right side and the wheel 1 on the left side.

Figure 16:
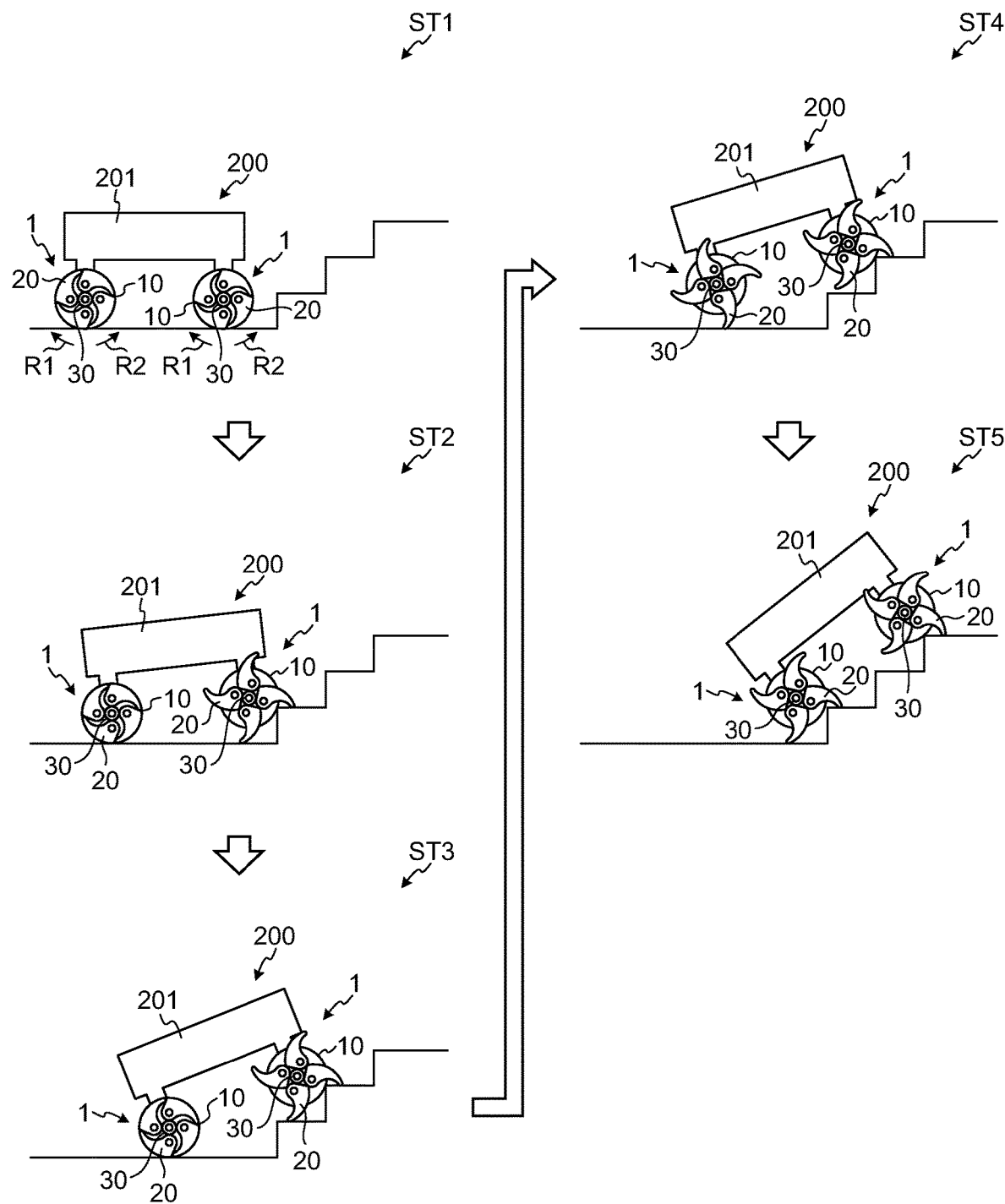
FIG. 16 is an explanatory diagram for a description of step moving-over operation by the vehicle illustrated in FIG. 15.

The following describes the operation of the vehicle 200 with reference to FIG. 16. FIG. 16 is an explanatory diagram for description of a step moving-over operation by the vehicle 200 illustrated in FIG. 15. As illustrated in FIG. 16, the vehicle 200 moves in a direction in which each wheel 1 rotates in the normal rotational direction R1 and there are steps in the traveling direction. In addition, it is assumed that each step is higher than the radius of each wheel 1 and lower than the diameter of the wheel 1.

As illustrated in Step ST1 in FIG. 16, when the vehicle 200 is yet to reach the steps but in flat ground traveling, each arm 20 is maintained at the closed rotational position by controlling the rotational direction and rotational speed of the output shaft of each of the arm actuator 35 and the outer ring actuator 55 so that the arm drive gear 30 and the outer ring 10 rotate at the same rotational speed in the same rotational direction. Accordingly, the wheel 1 maintains a circular shape and the outer peripheral surface 11 of the outer ring 10 (refer to FIG. 1) and the first arc wall part 25 (refer to FIG. 1) of each arm 20 serve as the rolling peripheral surface of the wheel 1.

As illustrated in Step ST2 in FIG. 16, when the vehicle 200 has approached the steps or when the wheels 1 on the front wheel side have reached the steps, each arm 20 of each wheel 1 on the front wheel side is opened at the opened rotational position by stopping rotation of the output shaft of the outer ring actuator 55 of the wheel 1 and driving only the arm actuator 35. Accordingly, each wheel 1 on the front wheel side transforms as the leading end part 28 (refer to FIG. 2) of the click part 23 of each arm 20 protrudes outside the outer peripheral surface 11 of the outer ring 10 in the radial direction.

After each arm 20 of each wheel 1 on the front wheel side is opened to the opened rotational position, the arm 20 is maintained at the opened rotational position by controlling the arm actuator 35 and the outer ring actuator 55 so that the arm drive gear 30 and the outer ring 10 rotate at the same rotational speed in the same rotational direction again. When each wheel 1 on the front wheel side reaches a step, the wheel 1 on the front wheel side moves onto the step by grappling the step with the click part 23 (refer to FIG. 2) of each arm 20.

As illustrated in Step ST3 in FIG. 16, after each wheel 1 on the front wheel side moves onto the first step, similarly for the second step, the wheel 1 on the front wheel side moves onto the step by grappling the step with the click part 23 of each arm 20. In this case, each wheel 1 on the rear wheel side is in a state in which each arm 20 is maintained at the closed rotational position.

As illustrated in Step ST4 in FIG. 16, when the wheels 1 on the rear wheel side have approached the steps, each arm 20 of each wheel 1 on the rear wheel side is opened at the opened rotational position by stopping the rotation of the output shaft of the outer ring actuator 55 of the wheel 1 and driving only the arm actuator 35. Accordingly, each wheel 1 on the rear wheel side transforms as the leading end part 28 of the click part 23 of each arm 20 protrudes outside the outer peripheral surface 11 of the outer ring 10 in the radial direction.

After each arm 20 of each wheel 1 on the rear wheel side is opened to the opened rotational position, each arm 20 is maintained at the opened rotational position by controlling the arm actuator 35 and the outer ring actuator 55 so that the arm drive gear 30 and the outer ring 10 rotate at the same rotational speed in the same rotational direction again.

As illustrated in Step ST5 in FIG. 16, when the wheels 1 on the rear wheel side have reached the steps, each wheel 1 on the rear wheel side moves onto a step by grappling the step with the click part 23 of each arm 20. In this case, each wheel 1 on the front wheel side moves onto the third step by grappling the step with the click part 23 of each arm 20.

At the transition to flat ground traveling after passing through the steps, each arm 20 is closed at the closed rotational position by stopping the rotation of the output shaft of the arm actuator 35 of each wheel 1 on the front wheel side and driving only the outer ring actuator 55. Accordingly, in each wheel 1 on the front wheel side, the leading end part 28 of the click part 23 of each arm 20 is housed inside the outer peripheral surface 11 of the outer ring 10 in the radial direction.

As described above, the vehicle 200 as the application form includes each wheel 1 and the vehicle body 201 to which the wheel rotational axis $A_W$ of the wheel 1 is fixed. At flat ground traveling, each arm 20 of the wheel 1 is housed inside the outer peripheral surface 11 of the outer ring 10 in the radial direction, and accordingly, the outer ring 10 rolls. Since the vehicle 200 includes the wheel 1 in which the outer ring 10 being not transformed rolls at flat ground traveling, the vehicle 200 can maintain stability at flat ground traveling. At step traveling, each arm 20 of the wheel 1 protrudes outside the outer peripheral surface 11 of the outer ring 10 in the radial direction, and accordingly, the vehicle 200 can move over a step by catching the step with the arm 20. Each arm 20 of the wheel 1 can be opened and housed with a simple structure in which the outer ring 10 and the arm drive gear 30 relatively rotate.

The wheels 1, 2, and 3 and the vehicle 200 of the embodiments may be modified as appropriate. For example, the numbers and shapes of arms 20 and 120 are not limited to those in the embodiments. Moreover, although the rotational amount of each arm 20 is restricted by the base end side wall part 27 and the stopping part 29 (refer to FIG. 2) and the rotational amount of each arm 120 is restricted by the first stopper 117 and the second stopper 118 (refer to FIGS. 10 and 13), the restriction may be provided by a separately provided limiter component.

Furthermore, various sensors are preferably attached to the wheels 1, 2, 3, and 4 to control various kinds of actuation of the wheels 1, 2, 3, and 4. In addition, the protrusion amounts of the arms 20 and 120 may be adjustable by controlling the arm actuators 35 and 135 and the outer ring actuators 55 and 155. For example, not only step traveling but also traveling on a rough road such as a snowy road on flat ground can be handled by protruding the arms 20 and 120 by protrusion amounts smaller than in a case of step traveling.

REFERENCE SIGNS LIST 1, 2, 3, 4 wheel
10, 110 outer ring
11, 111 outer peripheral surface
12, 112 tire portion
13, 113 outside surface
14, 114 arm support portion
15, 115 inside surface
16, 116 outer ring gear
117 first stopper
118 second stopper
20, 120 arm
21, 121 shaft hole
22 base end circular part
23 click part
24 tooth part
25 first arc wall part
26 second arc wall part
27 base end side wall part (first stopper)
28 leading end part
29 stopping part (second stopper)
122 base end part
123 click part
124 gear part
125 first arc wall part
126 second arc wall part
127 straight wall part
128 leading end part
129 small wheel
30, 130 arm drive gear
31, 131 arm drive shaft
32 outer end part
33 inner end part
134 arm decelerator
35, 135 arm actuator
50, 150 outer ring drive gear
51, 151 outer ring drive shaft
52 outer end part
53 inner end part
154 outer ring decelerator
55, 155 outer ring actuator
70 electromagnetic clutch
71 rotor
72 stator
73 armature
74 outside surface
75 inside surface
180 cover
181 opening part
90, 190 support portion
200 vehicle
201 vehicle body
$A_W$ wheel rotational axis
$A_A$ arm rotational axis
$A_D$ outer ring drive rotational axis
R1 normal rotational direction
R2 reverse rotational direction
ST1, ST2, ST3, ST4, ST5 step

The invention claimed is:
1. A wheel comprising:
an outer ring that rotates about a wheel rotational axis;
an arm drive shaft that includes a rotational axis coaxial with the wheel rotational axis and that is inserted into a hole formed at a center of the outer ring;
an arm drive gear that is provided at the arm drive shaft and that rotates independently from the outer ring about the wheel rotational axis;
an arm capable of rotating about an arm rotational axis fixed to the outer ring, the arm being configured to partially protrude outside an outer peripheral surface of the outer ring in a radial direction as the arm drive gear rotates relative to the outer ring in one direction and to be housed inside the outer peripheral surface of the outer ring in the radial direction as the arm drive gear rotates relative to the outer ring in another direction opposite to the one direction;
an arm actuator that drives the arm drive gear through the arm drive shaft;
an outer ring gear that rotates integrally with the outer ring about the wheel rotational axis;
an outer ring drive gear that meshes with the outer ring gear and that rotates about an outer ring drive rotational axis parallel to the wheel rotational axis; and
an outer ring actuator that drives independently from the arm actuator and that drives the outer ring drive gear,
wherein in a state where the arm is housed inside the outer peripheral surface of the outer ring in the radial direction, when the arm actuator and the outer ring actuator are controlled such that the arm drive gear rotates in the one direction and a rotation of the outer ring stops, the arm partially protrudes outside the outer peripheral surface of the outer ring in the radial direction,
in a state where the arm partially protrudes outside the outer peripheral surface of the outer ring in the radial direction, when the arm actuator and the outer ring actuator are controlled such that a rotation of the arm drive gear stops and the outer ring rotates in the one direction, the arm is housed inside the outer peripheral surface of the outer ring in the radial direction, and
when a rotational direction and a rotational speed of an output shaft of each of the arm actuator and the outer ring actuator are controlled such that the arm drive gear and the outer ring rotate at a same rotational speed in a same rotational direction, the state where the arm protrudes or the state where the arm is housed is maintained.

2. The wheel according to claim 1, wherein the arm includes a tooth part that meshes with the arm drive gear, rotates in the other direction as the arm drive gear rotates relative to the outer ring in the one direction, and rotates in the one direction as the arm drive gear rotates relative to the outer ring in the other direction.

3. The wheel according to claim 1, wherein the arm includes, at part of an outer peripheral surface, a first arc wall part having a convex shape with a curvature center identical to a curvature center of the outer ring and with a curvature radius equal to a curvature radius of the outer ring in a state of being housed inside the outer peripheral surface of the outer ring in the radial direction.

4. The wheel according to claim 1, wherein the arm includes, at part of an outer peripheral surface, a second arc wall part having a concave shape partially protruding outside from the outer peripheral surface of the outer ring in the radial direction in a state of partially protruding outside from the outer peripheral surface of the outer ring in the radial direction.

5. The wheel according to claim 1, further comprising:
a first stopper in the one direction configured to restrict a rotation range of the arm in the one direction; and
a second stopper in the other direction configured to restrict a rotation range of the arm in the other direction.

6. A vehicle comprising:
the wheel according to claim 1; and
a vehicle body to which the wheel rotational axis of the wheel is fixed.

* * * * *